United States Patent [19]
Fushimi et al.

[11] Patent Number: 5,689,315
[45] Date of Patent: Nov. 18, 1997

[54] LIGHT VALVE APPARATUS WHICH IS EMPLOYED IN A PROJECTION DISPLAY SYSTEM AND IN A VIEW-FINDER SYSTEM

[75] Inventors: Yoshimasa Fushimi, Hirakata; Yoshito Miyatake, Neyagawa, both of Japan

[73] Assignee: Matsushita Electric Industrial Co., Ltd., Osaka, Japan

[21] Appl. No.: 91,191

[22] Filed: Jul. 14, 1993

[30] Foreign Application Priority Data

Jul. 15, 1992 [JP] Japan .................. 4-187813
Oct. 9, 1992 [JP] Japan .................. 4-271334
Oct. 9, 1992 [JP] Japan .................. 4-271335

[51] Int. Cl.$^6$ ........................... G02F 1/1335; G02B 6/08
[52] U.S. Cl. ........................ 349/5; 349/57; 349/95
[58] Field of Search ............................ 359/40, 41, 49, 359/619, 48, 620, 621, 622; 353/122, 31, 38, 102; 354/219; 349/1, 5, 58, 57, 95, 145; 396/373, 382; 348/761, 766, 790

[56] References Cited

U.S. PATENT DOCUMENTS

| | | | |
|---|---|---|---|
| 5,042,929 | 8/1991 | Tanaka et al. | 359/708 |
| 5,052,783 | 10/1991 | Hamada | 359/40 |
| 5,056,912 | 10/1991 | Hamada et al. | 353/38 |
| 5,083,854 | 1/1992 | Zampolin et al. | 359/40 |
| 5,168,384 | 12/1992 | Genba | 359/88 |

FOREIGN PATENT DOCUMENTS

| | | | |
|---|---|---|---|
| 0512893 | 11/1992 | European Pat. Off. | 359/619 |
| 0518362 | 12/1992 | European Pat. Off. | 359/63 |
| 1-189685 | 7/1989 | Japan . | |
| 2-209093 | 8/1990 | Japan . | |
| 2-262185 | 10/1990 | Japan . | |
| 2-302726 | 12/1990 | Japan . | |
| 3-140920 | 6/1991 | Japan . | |
| 3-175429 | 7/1991 | Japan . | |
| 4-75024 | 3/1992 | Japan . | |
| 4-366917 | 12/1992 | Japan . | |

OTHER PUBLICATIONS

H. Hamada et al., "Brightness Enhancement of an LCD Projector by a Planar Microlens Array", SID 92 Digest, pp. 269-272., 1992. No date and month available.

Primary Examiner—William L. Sikes
Assistant Examiner—Tai V. Duong
Attorney, Agent, or Firm—Wenderoth, Lind & Ponack

[57] ABSTRACT

A light valve apparatus in which a first lens array, a second lens array, and a light valve are arranged sequentially from an incident light side, and a focal length of each of the microlens elements for the first lens array is set shorter than a focal length of each of the microlens elements for the second lens array. The respective microlens elements of the second lens array are adapted to form a real image, corresponding to an imaginary object on a focal point of the respective microlens elements of the first lens array, on corresponding pixels of the light valve. A plurality of very small light source images corresponding to the light source are formed by the first lens array, and light emitted from the plurality of very small light source images are incident upon the respective microlens elements of the second lens array such that the images are projected onto the pixels of the light valve. Therefore, since the light incident upon the openings of the light valve can be increased without thinning an incident side glass substrate of the light valve, the substantial aperture ratio of the light valve apparatus may be improved. When the light valve apparatus of the present invention is used for a projection display system, projected images are significantly brightened, and if the light valve apparatus is utilized in a view-finder system, not only is the brightness of displayed images improved, but it also becomes possible to reduce the power consumption of the system.

10 Claims, 25 Drawing Sheets

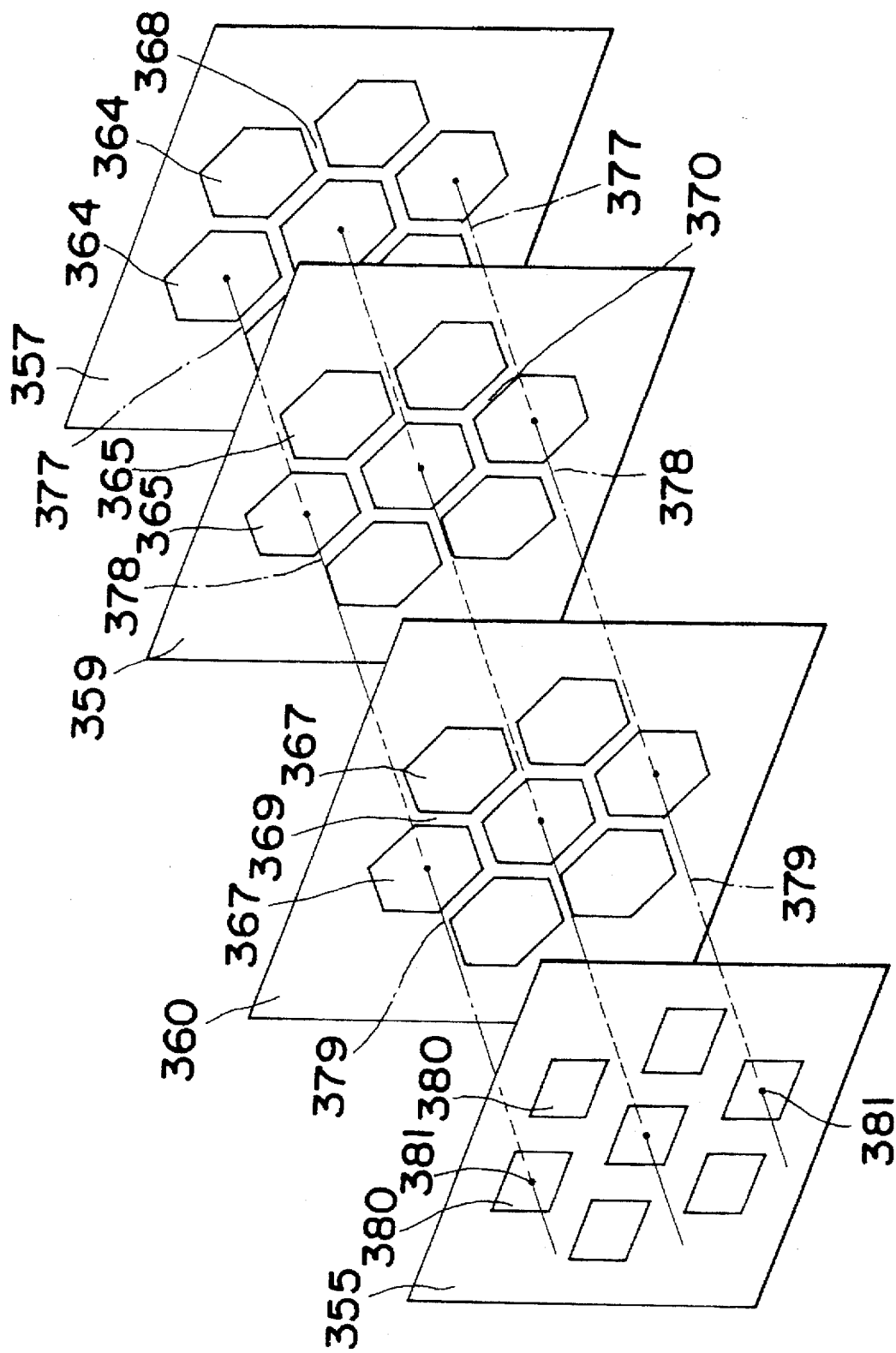

LIGHT VALVE APPARATUS WHICH IS EMPLOYED IN A PROJECTION DISPLAY SYSTEM AND IN A VIEW-FINDER SYSTEM

BACKGROUND OF THE INVENTION

1. Field of the Invention

The present invention relates to a light valve apparatus for use in a projection display system and a view-finder system. Conventionally, there has been known a system in which optical images corresponding to video signals are formed on a light valve, and light is irradiated onto the optical images for projection onto a large screen through magnification by a projection lens. Recently, there has been disclosed a projection display unit which employs a liquid crystal panel as a light valve, for example, in U.S. Pat. No. 5,042,929 to Tanaka et al., to which attention has been directed from the viewpoint that the projection unit may be made compact as a whole.

In order to obtain a projection image with high image quality, there has been a tendency to employ twist nematic (TN) liquid crystals in the liquid crystal panel, and thin film transistors (TFT) have been employed for respective pixels (i.e., picture elements) as switching elements so as to adopt an active matrix type, with three sheets of liquid crystal panels being used for red, green and blue respectively.

2. Description of the Prior Art

FIG. 23 shows one example of conventional constructions of an optical system for a projection display system employing the liquid crystal panel.

In the known arrangement of FIG. 23, light emitted from a light source 11 is incident upon a color separating optical system constituted by dichroic mirrors 12 and 13, and a flat mirror 14 so as to be separated into light rays in three primary colors of red, green and blue. Each primary light color passes through incident side polarizing plates 18, 19 and 20 after having been transmitted through field lenses 15, 16 and 17 and is incident upon the liquid crystal panels 21, 22 and 23. The optical images formed as variations of rotatory polarization in the liquid crystal panels 21, 22 and 23 according to video signals are formed into optical images varying in transmittance by the action of the incident side polarizing plates 18, 19 and 20, and emitting side polarizing plates 24, 25 and 26. Light rays emitted from the liquid crystal panels 21, 22 and 23 are combined into one light by a color combining optical system constituted by dichroic mirrors 27 and 28 and a flat mirror 29. The combined light is incident upon a projection lens 30, and the optical images on the three liquid crystal panels 21, 22 and 23 are projected onto a projection screen (not shown) through magnification by the lens 30.

FIG. 24 shows the construction of a conventional thin film transistor (TFT) liquid crystal panel.

In FIG. 24, the TFT liquid crystal panel generally includes two sheets of glass substrates 41 and 42 disposed through a predetermined interval and sealed therearound by a sealing resin for defining a closed space therebetween, in which TN liquid crystal 43 is enclosed.

At the side of the liquid crystal layer 43 of the incident side glass substrate 41, a common electrode 44 of a transparent conductive film is provided, while at the side of the liquid crystal layer 43 of the emitting side glass substrate 42, pixel electrode 45 is formed in a matrix pattern by a transparent conductive film, with TFT 46 being formed in the vicinity of the respective pixel electrodes 45 as switching elements. On the common electrode 44 and the pixel electrode 45, alignment films for orientating the TN liquid crystal in a predetermined state are formed. At the incident side and the emitting side of the liquid crystal panel, the polarizing plates 47 and 48 are disposed, with absorbing axes directed in a predetermined direction. In order to prevent erroneous functions of the TFT 46 by the intense light incident upon the liquid crystal panel, black matrixes 49 of metallic thin films are formed at the side of the liquid crystal layer 43 of the incident side glass substrate 41 for shielding the TFT 46 and wirings against light. Upon application of signal voltages to the respective pixels through the TFT 46, the rotatory polarization of the liquid crystal layer for the respective pixels is varied, whereby the transmittance of each of the pixels can be controlled by the action of the two polarizing plates 47 and 48. Thus, the images of the variation of the transmittance of the pixels are displayed on the liquid crystal panel.

Furthermore, light to be utilized by the TFT liquid crystal panel in the construction as shown in FIG. 24 is limited to the light transmitted through the black matrix 49, and brightness of the projected images is proportional to the aperture ratio (i.e., ratio of the area for all the openings 50 of the black matrix 49 to a total area of the display region) of the liquid crystal panel. If light incident upon the non-opening portions 51 of the black matrix 49 can also be utilized, the projected images may be made brighter and the consumption of energy could be improved resulting in greater efficiency. Accordingly, there has also been conventionally disclosed, for example, in U.S. Pat. No. 5,052,783 to Hamada et al., a method for brightening projected images by disposing a lens array plate close to the incident side of the liquid crystal panel.

FIG. 25 shows an example of a conventional light valve apparatus in which a lens array plate is combined with the liquid crystal panel.

In FIG. 25, a lens array plate 61 has a plurality of microlens elements 64 formed in a matrix pattern on a surface of a transparent substrate 62 at the side of the liquid crystal panel 63. The lens array plate 61 is disposed close to the liquid crystal panel 63 so that the microlens elements 64 and the pixels 50 of the liquid crystal panel 63 correspond to each other. Light incident upon the lens array plate 61 is converted into converged light which is incident upon the pixel 50 by the microlens elements 64. Since light incident upon the non-opening portions 51 of the black matrix 49 is also incident upon the opening portions 50, the substantial aperture ratio of the liquid crystal panel 63 is improved, and the projected images are further brightened.

In order to obtain very fine projected images using the construction as shown in FIG. 25, the number of pixels of the liquid crystal panel may be increased. If the dimensions of the display screens of the liquid crystal panels are the same, the pixel pitch is to be decreased, in which case, however, problems as described below will occur.

In the case where a lens array is employed, real images of the light source are formed on the pixels 50 of the liquid crystal panel 63. When the size of such real images is larger than that of the pixel 50, although the substantial aperture ratio may be improved upon incidence of parallel light rays, the projected images will not be brightened. To reduce the size of the real image of the light source, a focal length of the microlens element 64 for the lens array plate 61 must be reduced, and for this purpose, it is necessary to make the glass substrate 41 at the incident side thinner. However, if the incident side glass substrate 41 is made thin, it becomes difficult to make the thickness of the liquid crystal layer 43 uniform. In order to overcome such an inconvenience, there has also been conventionally proposed, for example, in Japanese Patent Laid-Open Publication Tokkaihei No. 2-302726 by Ito et al., a method for disposing lens elements within an incident side glass substrate 41.

In connection with the above, however, in the case where a lens array of a refractive index distribution type is prepared by the ion exchange method, it is required to employ a glass material containing alkali ion as the glass substrate, and in this case, there is a problem in that characteristics of the TFT are undesirably deteriorated by the elution of the alkali ion. Meanwhile, when the lens array is formed between two glass substrates, different materials in the refractive index must be combined, and in this case, it is also difficult to make the thickness of the liquid crystal layer uniform in a broad temperature range due to a difference in the thermal expansion coefficient. Nonetheless, by the practice to form the microlens elements within the incident side glass substrate, it is difficult to display images at high quality on the liquid crystal panel. Thus, as a result of the aforementioned drawbacks, fine and bright projection images at high quality can not be readily obtained.

Subsequently, with respect to a video camera, it is necessary to make the entire unit compact in size and light in weight for improving portability, and employment of a liquid crystal panel for the viewfinder is considered to reduce the size of the video camera as a whole. In order to make the viewfinder compact and light weight, and to display an image with high quality on the liquid crystal panel, the size of the display screen for the liquid crystal panel must be reduced, while increasing the number of pixels. In other words, the pitch of the pixels for the liquid crystal panel must be decreased. In this case, however, the aperture ratio of the liquid crystal panel is made small, and thus, the displayed image is dark. Although a brighter light source may be employed for making the displayed image brighter, power consumption by the light source becomes large, and continuous operation time without requiring a charging of a battery is undesirably reduced.

SUMMARY OF THE INVENTION

Accordingly, an essential object of the present invention is to provide a light valve apparatus which is capable of displaying bright projection images without reducing the thickness of a glass substrate, even in the case where the pixel pitch for a liquid crystal panel is small. A further object of the present invention is to provide a projection display system and a view-finder system providing a bright display image at a low power consumption by employing the light valve apparatus as referred to above.

Still another object of the present invention is to provide a light valve apparatus for use in a projection display system and a view-finder system, all of which are simple in construction and stable in functioning at high reliability, and can be readily manufactured inexpensively.

According to one embodiment of the present invention, there is provided a light valve apparatus which comprises a light valve in which a plurality of pixels are arranged in a first matrix pattern, a first lens array in which a plurality of microlens elements are arranged in a second matrix pattern similar to the first matrix pattern of the pixels of the light valve, and which is disposed at an incident side of the light valve, and a second lens array in which a plurality of microlens elements are arranged in a third matrix pattern similar to the first matrix pattern of the pixels of the light valve, and which is disposed between the light valve and the first lens array. A focal distance of each of the microlens elements of the first lens array is equal to or shorter than a focal distance of each of the microlens elements of the second lens array, and the respective microlens elements of the second lens array are adapted to form real images of a virtual light source at focal points of the first lens array on the corresponding pixels of the light valve. The first lens array is formed on an emitting side or in the vicinity of a surface of a transparent substrate disposed at an incident side of the light valve, and the second lens array is formed on an incident face or in the vicinity of a surface of another transparent substrate disposed at an incident side of the light valve.

In still another embodiment of the present invention, it is so arranged that an optical axis of each of the microlens elements of the second lens-array is aligned with an optical axis of the corresponding microlens element of first lens array.

A focal length of each of the microlens elements for the second lens array is equal to $f_2=(2m+1)f_1/2$ or $f_2=mf_1$, where $f_1$ is a focal length of each of the microlens elements for the first lens array and m is a positive integer.

In a further aspect of the present invention, it is so arranged that the light valve has the pixels thereof subjected to a square arrangement, and an optical axis of each of the microlens elements of the first lens array passes through a middle point of a line connecting centers of two adjacent microlens elements of the second lens array or a center of a square constituted by centers of the four adjacent microlens elements of the second lens array.

In another embodiment of the present invention, there is provided a projection display system which includes a light source, a light valve apparatus upon which light emitted from the light source is incident and in which optical images are formed according to video signals, a projection lens for projecting the optical images onto a screen, and with any one of the above light valve apparatuses being employed.

In still another embodiment of the present invention, there is provided a view-finder system which includes a light source, a light valve apparatus upon which light emitted from the light source is incident and in which optical images are formed according to video signals, and a magnifying lens for magnifying the optical images, with any one of the above light valve apparatuses being employed.

According to the present invention, the aforementioned embodiments provide an improved light valve apparatus with a large aperture ratio, which can be realized without any restriction to the light valve, and moreover, a projection display system having bright projection images, and a view-finder system having bright display images at a low power consumption can be advantageously provided.

BRIEF DESCRIPTION OF THE DRAWINGS

These and other objects and features of the present invention will become apparent from the following description taken in conjunction with the preferred embodiments with reference to the accompanying drawings in which;

FIG. 18 is a schematic perspective diagram showing the construction of a light valve apparatus according to a third embodiment of the present invention, FIGS. 19 (a) and 19 (b) are schematic perspective diagrams showing the construction of light valve apparatuses according to embodiments of the present invention.

DETAILED DESCRIPTION OF THE INVENTION

Figure 1:
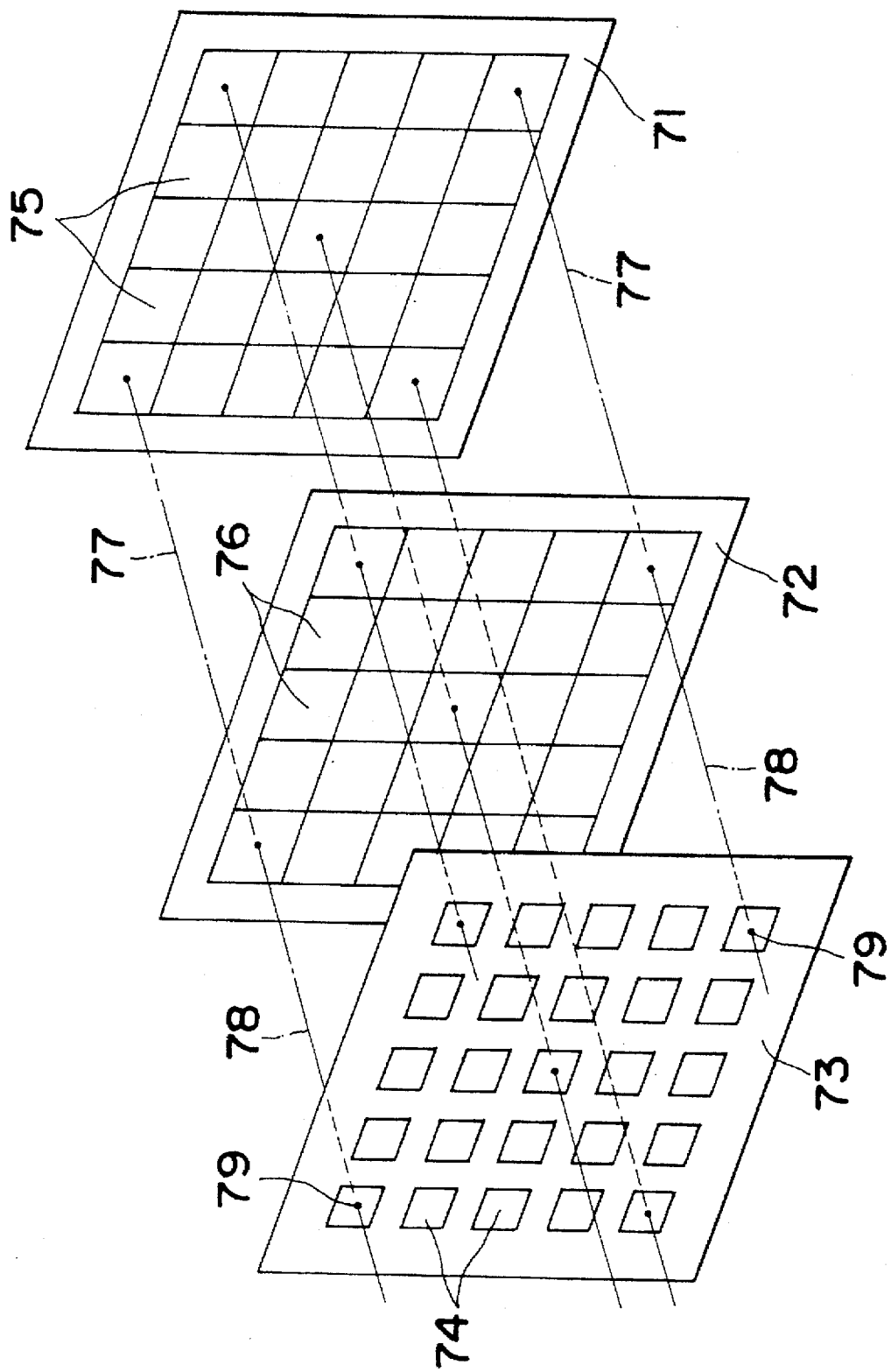
FIG. 1 is a schematic perspective diagram of a model for explaining the functions of a light valve apparatus according to the present invention.

In the description of the present invention, it is to be noted that like parts are designated by like reference numerals throughout the accompanying drawings.

Before describing embodiments according to the present invention, the principle for a light valve apparatus according to the present invention will be explained hereinbelow.

Referring now to the drawings, FIG. 1, shows a model of a light valve apparatus according to the present invention, in which a first lens array 71, a second lens array 72, and a light valve 73 are sequentially disposed from a light incident side. It is understood that each of the light valve 73, the first lens array 71, and the second lens array 72 is very thin, with air present in spaces therebetween. The light valve 73 has its pixels 74 arranged in a square pattern. In the first lens array 71 and the second lens array 72, square microlens elements 75 and 76 are also arranged in a square pattern respectively, and there are no non-lens regions in any of the lens arrays 75 and 76. It is understood that all of the microlens elements 75 and 76 are thin and ideal lenses without any aberration. It is also understood that the pitches of the microlens elements 75 and 76 for the first lens array 71 and the second lens array 72 are exactly the same as the pitch of the pixels 74 for the light valve 73. Furthermore, an optical axis 77 of each of the microlens element 75 and an optical axis 78 of the corresponding microlens element 76 are aligned with each other, and each of the optical axes 77 and 78 passes through a center 79 of the pixel 74 for the light valve 73.

Figure 2:
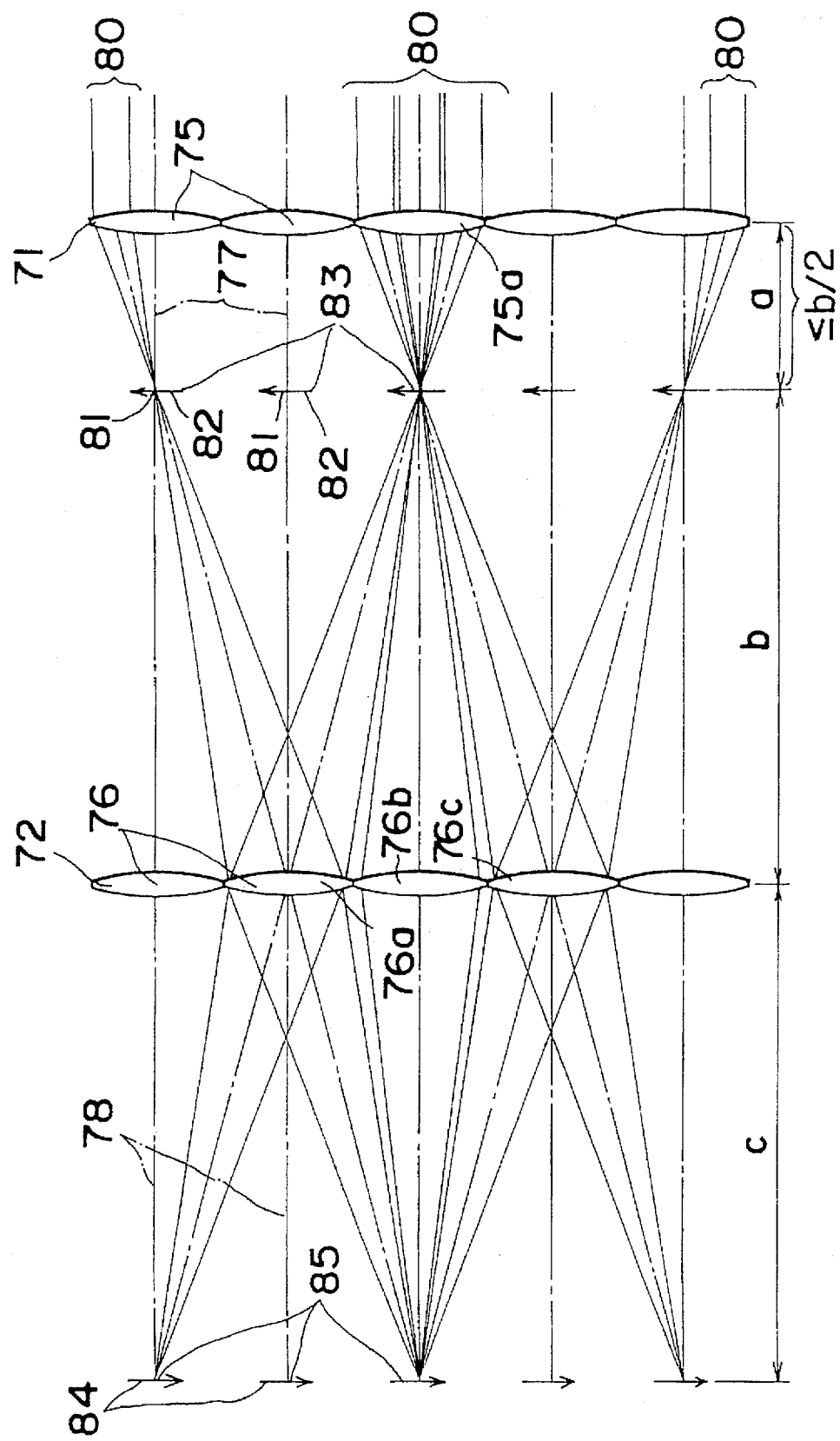
FIG. 2 is a schematic diagram for showing paths corresponding to the arrangement of FIG. 1.

An optical path diagram corresponding to FIG. 1 is shown in FIG. 2. Upon the incidence of light 80 from a light source (not shown here) on the first lens array 71, each of the microlens elements 75 of the first lens array 71 forms a very small real image 82 which corresponds to the light source on each focal point 81. In other words, a first very small light source group 83 is formed at the emitting side of the first lens array means 71. Each of the microlens elements 76 of the second lens array means 72 forms an equal size real image 84 of the very small light source 82 rotated by 180°. In other words, a second very small light source group 85 is formed at the emitting side of the second lens array means 72. The pitch of the first very small light source group 83 and the pitch of the second very small light source group 85 are equal to each other. In the case where the optical axis 77 of each of the microlens elements 75 is aligned with the optical axis 78 of the corresponding microlens element 76, the second very small light source group 85 formed by the respective microlens elements 76 entirely overlaps the respective very small light sources 84. When the pixel pitch of the light valve 73 is equal to the pitch of the second very small light source group 85, the respective pixels 74 of the light valve 73 can be overlapped with the respective very small light sources 84 of the second very small light source group 85.

If a distance from a focal point 81 to a principal point of the microlens element 76 is longer than a focal distance of the microlens element 75, light emitted from one microlens element 75a of the first lens array 71 is incident upon the plurality of microlens elements 76a, 76b and 76c of the second lens array 72, and the light emitted therefrom is incident upon any of the pixels of the light valve 73. Thus, upon one pixel of the light valve 73, light is incident from the plurality of the microlens elements 76a, 76b and 76c of the second lens array 72.

A focal length of each of the microlens elements 75 for the first lens array 71 is represented by $f_1$, and that of each of the microlens elements 76 for the second lens array 72, by $f_2$.

The respective very small light sources 84 of the secondary small light source group 85 may be all overlapped as represented by the equations given below.

$$b = 2f_2 \quad (1)$$

$$c = 2f_2 \quad (2)$$

where b is the distance from the focal point 81 of the first lens array 71 to the principal point of the second lens array 72, and c is the distance from the principal point of the second lens array 72 to the pixel 74 of the light valve 73.

Moreover, when the distance from the principal point of the first lens array 71 to the focal point 81 is represented by a, the relation as follows is established.

$$a = f_1 \quad (3)$$

In the embodiment, the focal length $f_1$ is equal to or shorter than the focal length $f_2$, i.e., $a \leq b/2$.

Figure 3:
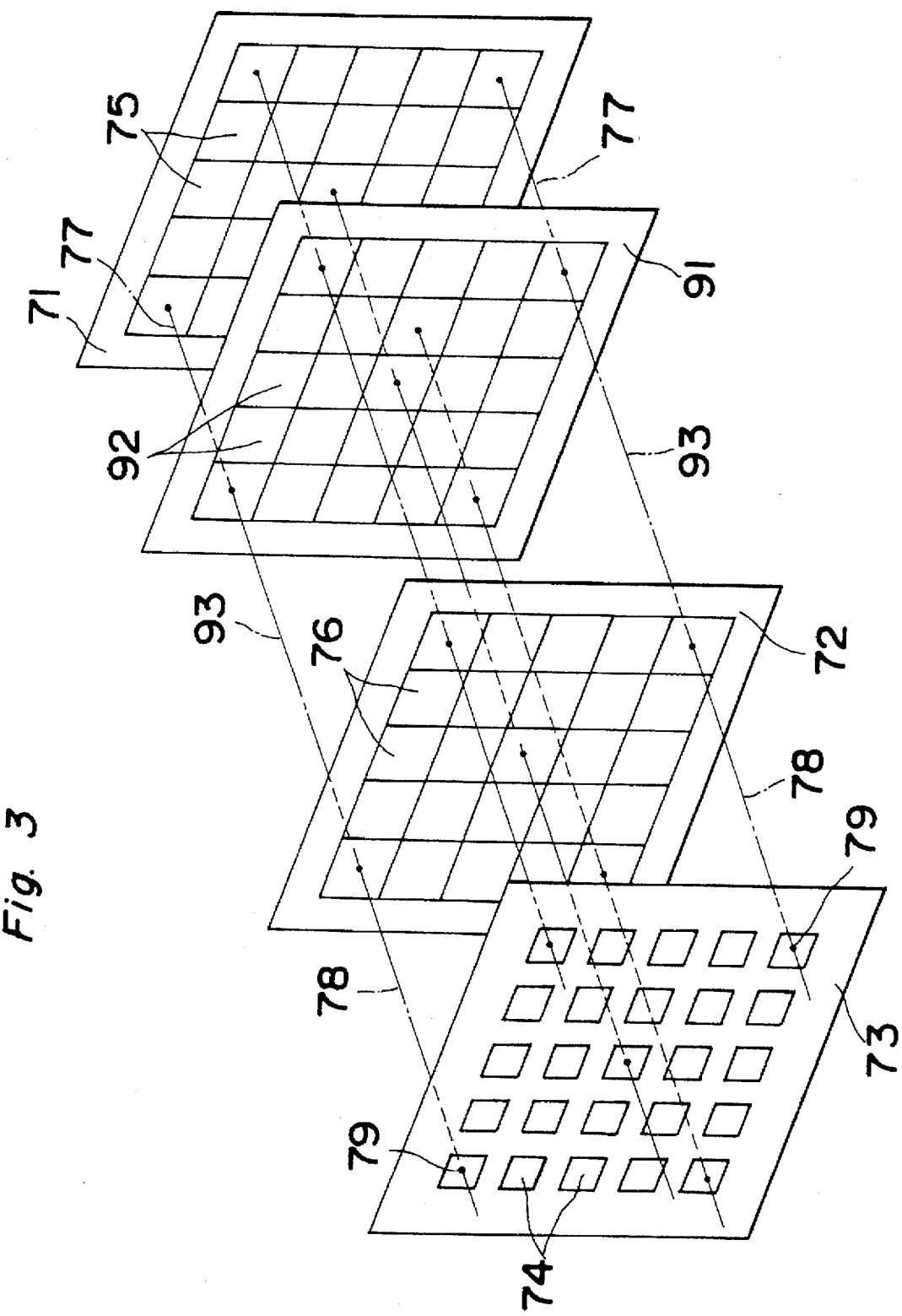
FIG. 3 is a schematic perspective diagram of a model similar to FIG. 1, in which a third lens array is added.

Furthermore, a model of the light valve apparatus in the case where a third lens array has been added is shown in FIG. 3, in which the first lens array 71, the second lens array 72, a third lens array 91 and the light valve 73 are disposed in that order from an incident side. Here, it is also assumed that each of the light valve 73, the first lens array 71, and the second lens array 72 and the third lens array 91 is very thin, with air present in the spaces therebetween. The constructions of the light valve 73, the first lens array 71, and the second lens array 72, and the arrangements of the respective pixels 74, and the respective microlens elements 75 and 76 are the same as those in FIG. 1. In the third lens array 91, square microlens elements 92 are arranged in a square form respectively, and there is no non-lens region therein. It is assumed that all of the microlens elements 92 are thin and ideal lenses without any aberration. It is also assumed that the pitch of the microlens elements 92 for the third lens array 91 is exactly the same as the pixel pitch of the light valve 73. Furthermore, and an optical axis 93 of each of the microlens elements 92 for the third lens array 91, is aligned with the corresponding optical axis 77 of each of the microlens elements 75 for the first lens array 71, and the corresponding optical axis 78 of each of the microlens elements 76 for the second lens array 72.

Figure 4:
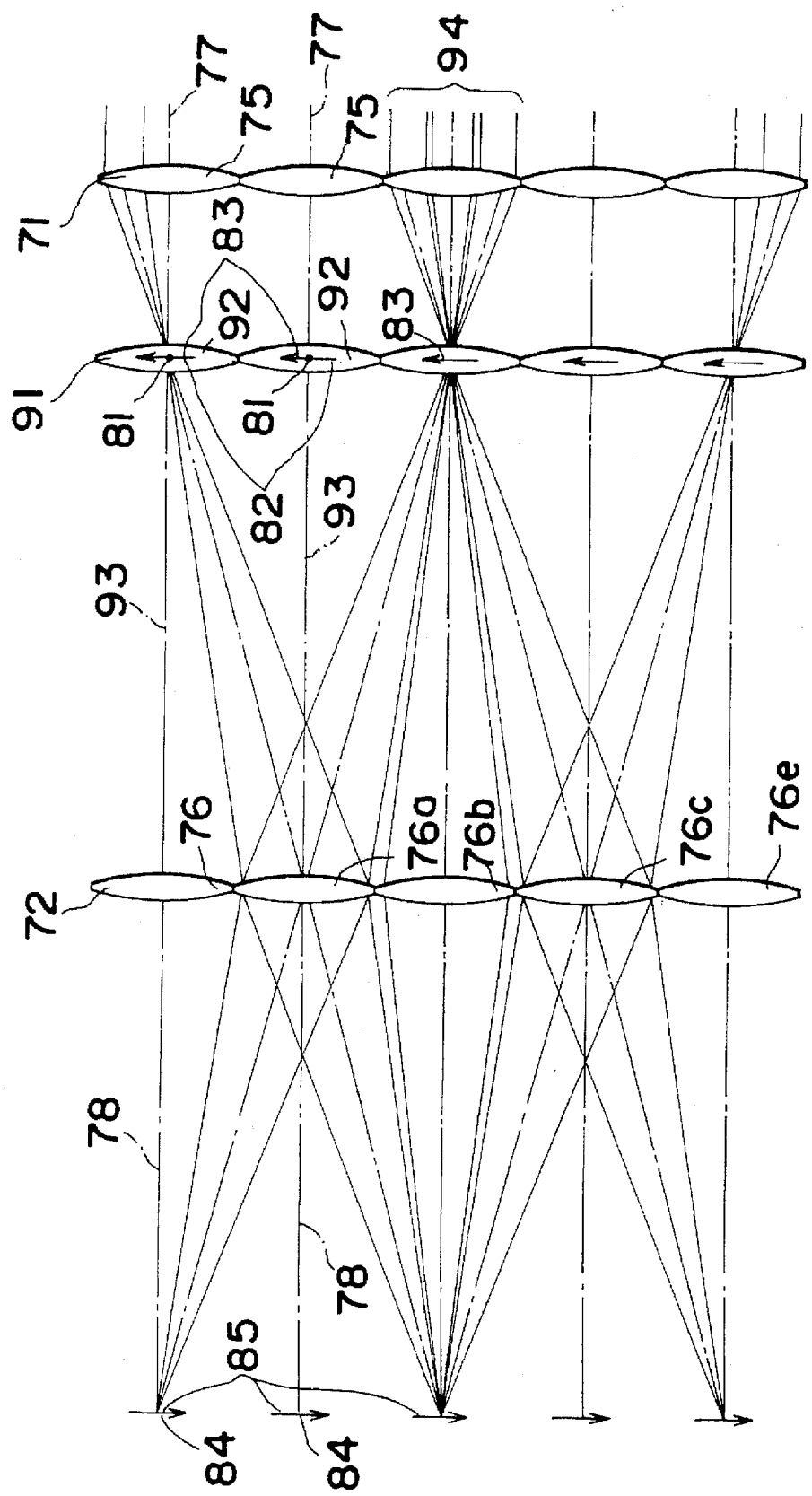
FIG. 4 is a schematic diagram showing optical paths corresponding to the arrangement of FIG. 3.

In the optical path diagram of FIG. 4 which corresponds to FIG. 3, light 94 incident from the light source forms, by each of the microlens elements 75 of the first lens array 71, a very small real image 82 corresponding to the light source on each focal point 81. The third lens array 91 is disposed such that the very small light source images 82 formed by the respective microlens elements 75 for the first lens array 71 are formed on the principal plane of the respective microlens elements 92. Accordingly, the images of the very small light sources 82, formed on the principal plane of each of the microlens elements 92 of the third lens array 91, is formed on each of the pixels of the light valve 73 by each of the microlens elements 76 of the second lens array 72.

Figure 5:
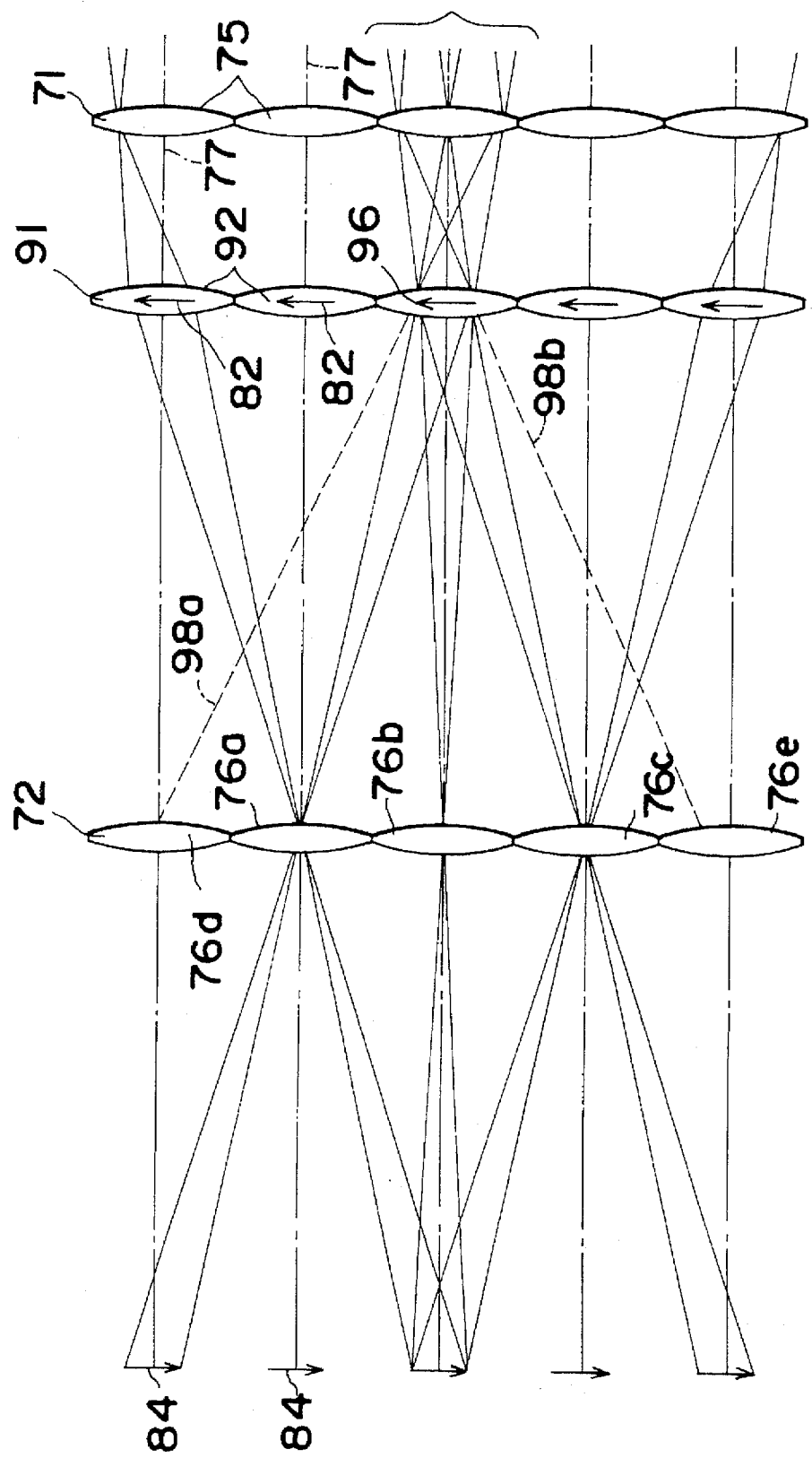
FIG. 5 is a schematic diagram showing the optical paths corresponding to the diagrams of FIGS. 3 and 4, FIGS. 6 and 7 are schematic diagrams showing general optical paths.

FIG. 5 shows an optical path diagram corresponding to FIGS. 3 and 4. Each of the microlens elements 92 of the third lens array 91 forms the image of an imaginary object on the principal plane of each of the microlens elements 75 for the first lens array 71, on the principal plane of each of the microlens elements 76 of the second lens array 72, whereby the light incident upon each of the microlens elements 75 of the first lens array 71 and passing through the end portion 96 of the very small light source 82 formed on the focal point 81 thereof, is incident upon the principal plane of each of the microlens elements 76 for the second lens array 72 by each of the microlens elements 92 from the third lens array 91.

Accordingly, the light rays from the first very small light source image group formed by each of the microlens elements 75 of the first lens array 71 are incident upon the corresponding microlens element 76 for the second lens array 72 so as to form a second very small light source image 84, and the light from the end portion 96 of the very small light source 82 can be incident upon each of the pixels 74 of the light valve 73.

As shown in FIG. 4, when the third lens array 91 is further added, the light 94 incident in a parallel relation with the optical axis passes through the focal point 81 of each of the microlens elements 75 for the first lens array 71 which is on the principal plane of each of the microlens elements 92 for the third lens array 91, and is incident upon each of the microlens elements 76 of the second lens array 72. Accordingly, based on the assumption that transmittance of the third lens array 91 is at 100%, the light incident upon the first lens array 71, in a parallel relation with the optical axis 77, may be incident upon each of the corresponding microlens elements 76 of the second lens array 72 without any loss.

On the other hand, in the absence of the third lens array 91, light rays 98a and 98b (FIG. 5), which are part of the light not parallel with the optical axis 77 of the first lens array 71, are not incident upon each of the corresponding microlens elements 76a and 76c of the second lens array 72, but enters the microlens elements 76d and 76e resulting in a loss. Therefore, by disposing the third lens array 91, the light not parallel with the optical axis 77 and incident upon each of the microlens elements 75 of the first lens array 71 can be efficiently incident upon each of the corresponding microlens elements 76a, 76b and 76c of the second lens array 72. Thus, the light rays emitted from the very small light source image group 83 formed by each of the microlens elements 75 of the first lens array 71 can be effectively utilized.

The equations (1), (2) and (3) referred to earlier may be established even when the third lens array 91 is provided. Moreover, when the focal length of each of the microlens elements 92 for the third lens array 91 is denoted by $f_3$, the relation will be represented by an equation as follows.

$$\frac{1}{f_3} = \frac{1}{a} + \frac{1}{b} \quad (4)$$

In the models as shown in FIGS. 1 and 3, although c is restricted by the light valve 73, there is no factor which will restrict a or b. Therefore, the focal length $f_1$ of the first lens array 71 can be shortened, as a result of which the size of each of the very small light sources 84 of the second very small light source group 85 is also reduced. Meanwhile, as described above, the light rays emitted from the first lens array 71 entirely reaches all of the pixels 74 of the light valve 73 through the plurality of the microlens elements 76 of the second lens array 72, and the aperture ratio of the light valve apparatus as shown in FIG. 1 may be substantially improved. If all the light rays emitted from the respective pixels of the light valve are incident upon the projection lens, the projected image will become brighter.

Subsequently, preferable conditions in the case where the significant aperture ratio is to be improved by the arrangements shown in FIG. 1 to FIG. 5 will be explained.

Figure 6:
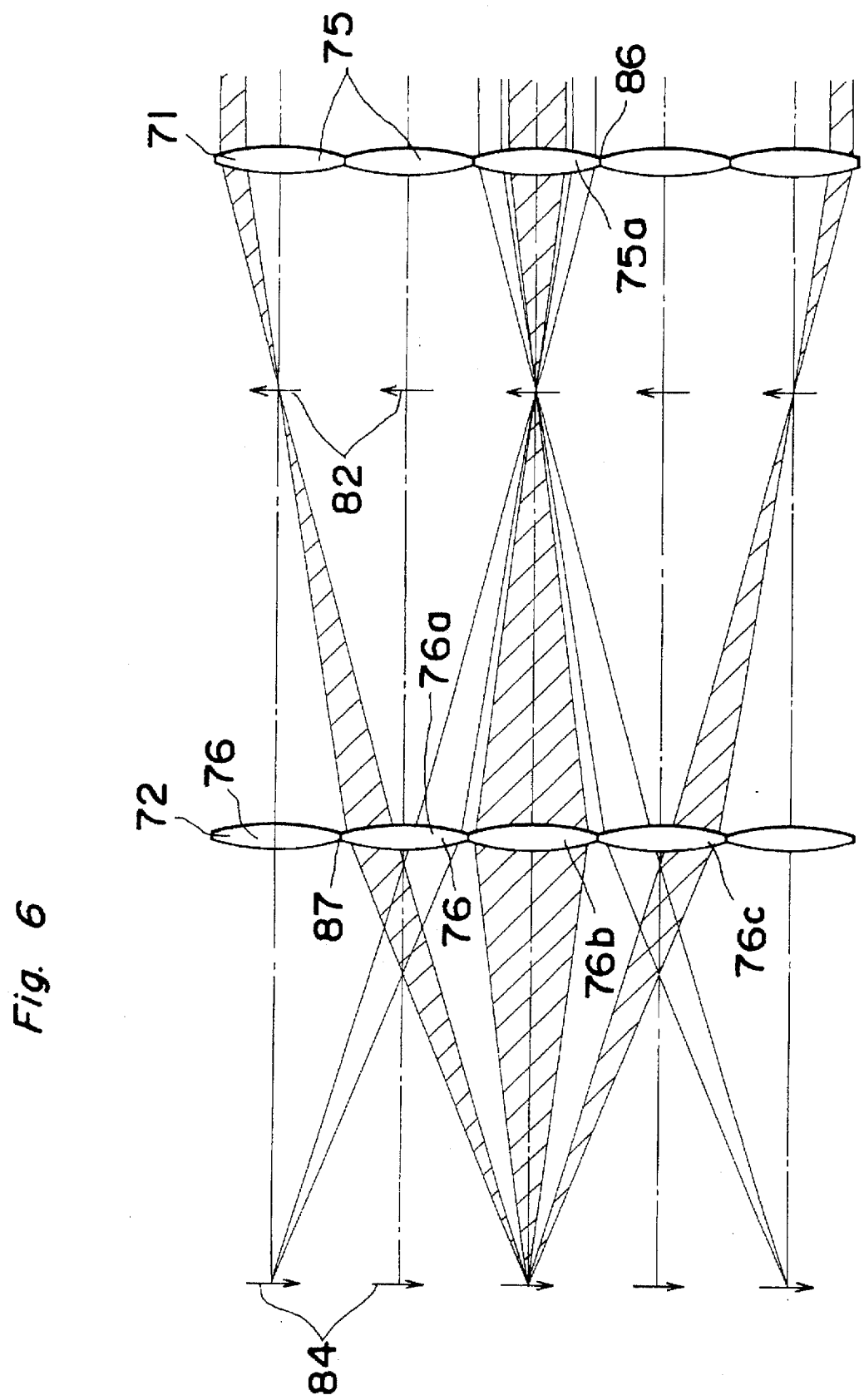
Figure 7:
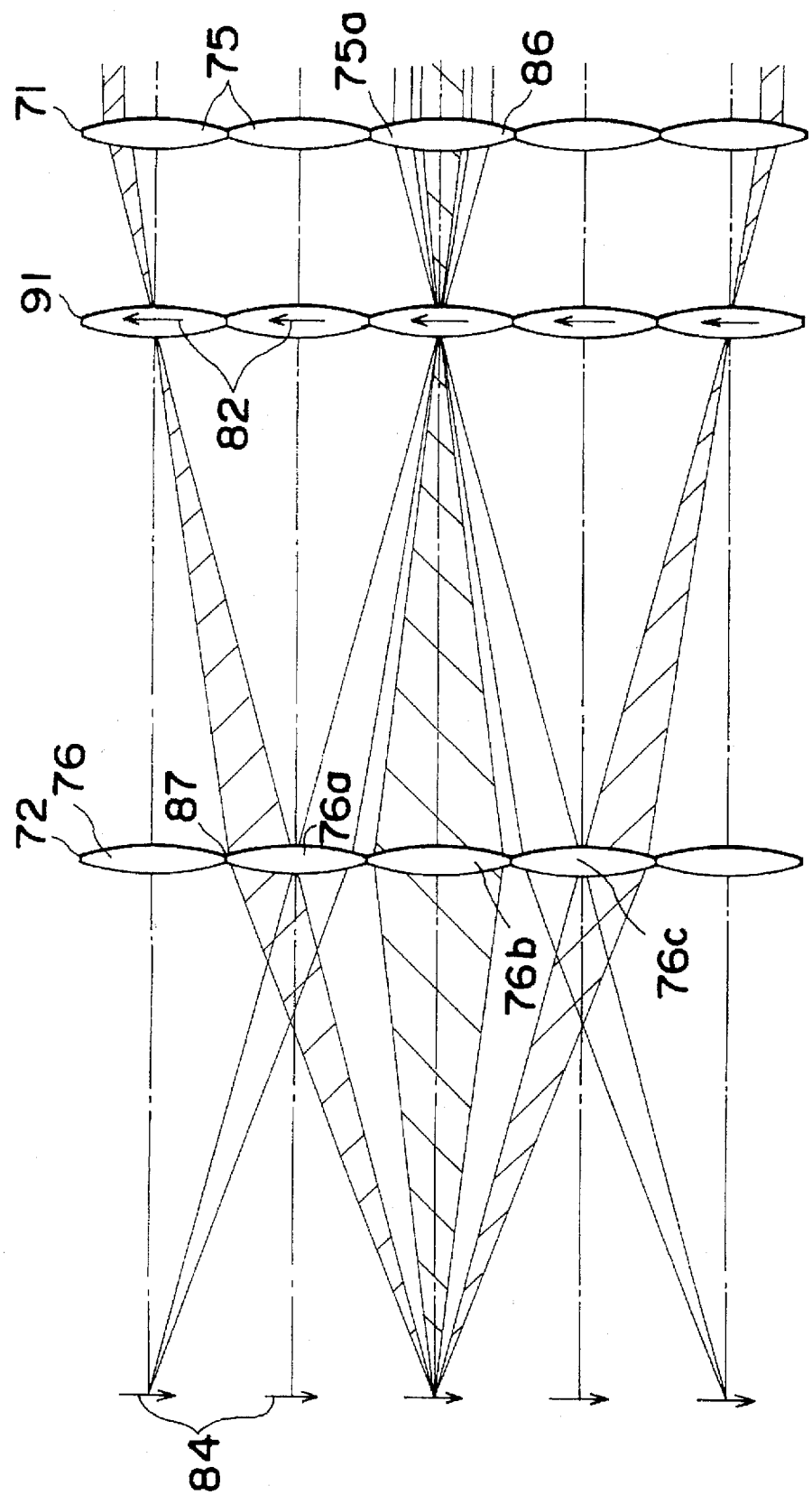

FIGS. 6 and 7 are optical path diagrams representing general cases in which light is incident upon one pixel of the light valve from the plurality of the microlens elements of the second lens array means.

In the states as shown in FIGS. 6 and 7, although the lens element 76b is utilized in the entire effective region, only part of such effective regions is utilized in the microlens elements 76a and 76c. In this case for the projection lens, since a middle region of its pupil is not utilized, there is a considerable portion which is wasted. In order to reduce the wasted portion, it may be arranged such that the light rays emitted from the edge portion 86 of one microlens element 75a of the first lens array 71 passes through the edge portion 87 of the assembly of the plurality of the neighboring microlens elements 76a, 76b and 76c. Such conditions may be represented by an equation, $$f_2 = \frac{(2m+1)f_1}{2} \quad (5)$$

wherein $f_1$ is the focal length of each of the microlens elements 75 of the first lens array 71, $f_2$ is the focal length of each of the microlens elements 76 of the second lens array 72, and m is a positive integer.

In FIGS. 2 and 4, although there is shown the case where, when the light emitted from one microlens element 75 of the first lens array 71 is incident upon the second lens array 72, it enters nine microlens elements 76, the number of the microlens elements is not limited to nine, but may be increased, for example, to twenty-five, forty-nine and so on, and in any case, it is desirable that equation (5) is satisfied.

According to the present invention, even in the case where the distance from the face of the incident side of the light valve to the light valve layer can not be shortened, by employing the two lens arrays as shown in the model of FIG. 1, or three lens arrays as shown in the model of FIG. 3, the light valve apparatus with a high aperture ratio can be realized. When this light valve apparatus is employed for a projection display system, bright projection images may be obtained. Moreover, if the light valve apparatus of the present invention is used for a view-finder system, bright display images can also be obtained.

It is to be noted here that in the foregoing embodiments, although descriptions are given with respect to the case where the pixels of the light valve are arranged in the square shape, and the optical axis of each of the microlens elements for the first lens array is aligned with that of each of the microlens elements for the second lens array, and also, with that of each of the microlens elements for the third lens array, the present invention is not limited in its application to the above case alone, but the intended effect of the present invention may be obtained even in the case where the pixels of the light valve are arranged differently, or the relation of the optical axis is changed. For example, the pixels of the light valve may be arranged in a delta form. This variation in the arrangement of pixels and of the optical axis is possible if the second very small light source group by each of the microlens elements for the second lens array is entirely overlapped.

Referring now to the drawings, embodiments according to the present invention will be described.

Figure 8:
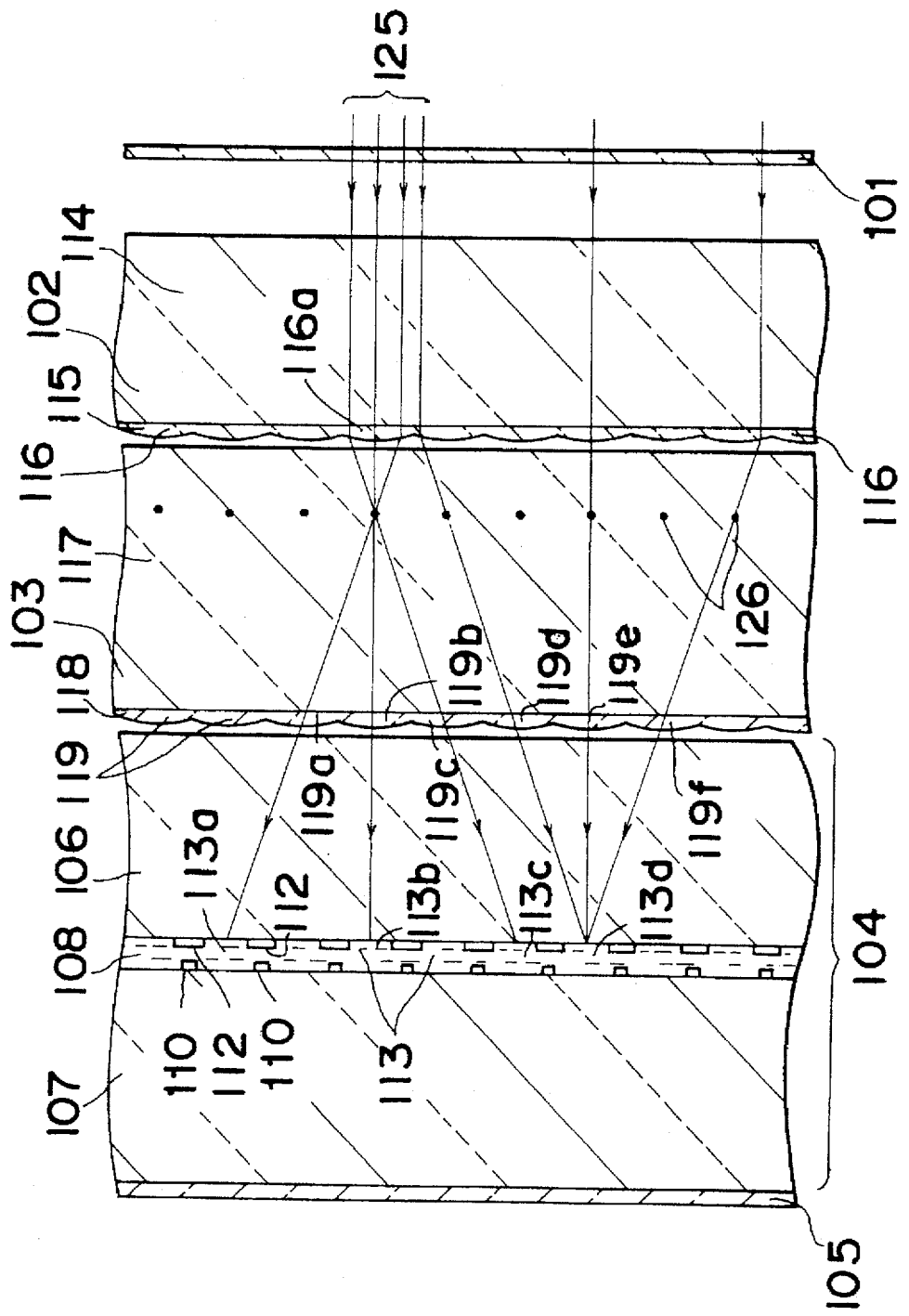
FIG. 8 is a fragmentary side sectional diagram showing on an enlarged scale, the construction of a light valve apparatus according to a first embodiment of the present invention.

FIG. 8 shows the construction of a light valve apparatus according to a first embodiment of the present invention.

In FIG. 8, the light valve apparatus of the present invention generally includes an incident side polarizing plate 101, a first lens array plate 102, a second lens array plate 103, a liquid crystal panel 104, and an emitting side polarizing plate 105 sequentially arranged from the incident side to the emitting side.

The liquid crystal panel 104 further includes two glass substrates 106 and 107, and a TN liquid crystal layer 108 enclosed and sealed between the glass substrates. At the side of the liquid crystal layer 108 of the emitting side glass substrate 107, pixel electrodes are formed by transparent conductive films in a matrix pattern, and in the vicinity of each of the pixel electrodes, TFT 110 is provided as a switching element. Between the neighboring pixel electrodes, signal lines and scanning lines are formed, and in each of the TFT 110, the source electrode is connected to the signal line, the gate electrode, the scanning line, the drain electrode, and to the pixel electrode. At the side of the liquid crystal 108 of the incident side glass substrate 106, a common electrode is formed by the transparent conductive film, and a black matrix 112 of a metallic thin film are formed thereon so as to cover the TFT 110, the signal lines and the scanning lines. The opening portion of the black matrixes 112 serve as the pixels 113. An alignment film is applied onto the pixel electrodes and the common electrode, and rubbing is effected for orientating the liquid crystal molecules in a predetermined state.

Upon application of an electric field to the liquid crystal layer of each of the pixels 113 by the signal feeding circuit and scanning circuit, the rotatory polarization of the liquid crystal layer is varied according to the electric field and an optical image, resulting from the variation of the rotatory polarization corresponding to the video signals, can be formed on the liquid crystal panel 104. This optical image will become an optical image based on the variation of transmittance by the action of the incident side polarizing plate 101 and the emitting side polarizing plate 105.

Figure 9:
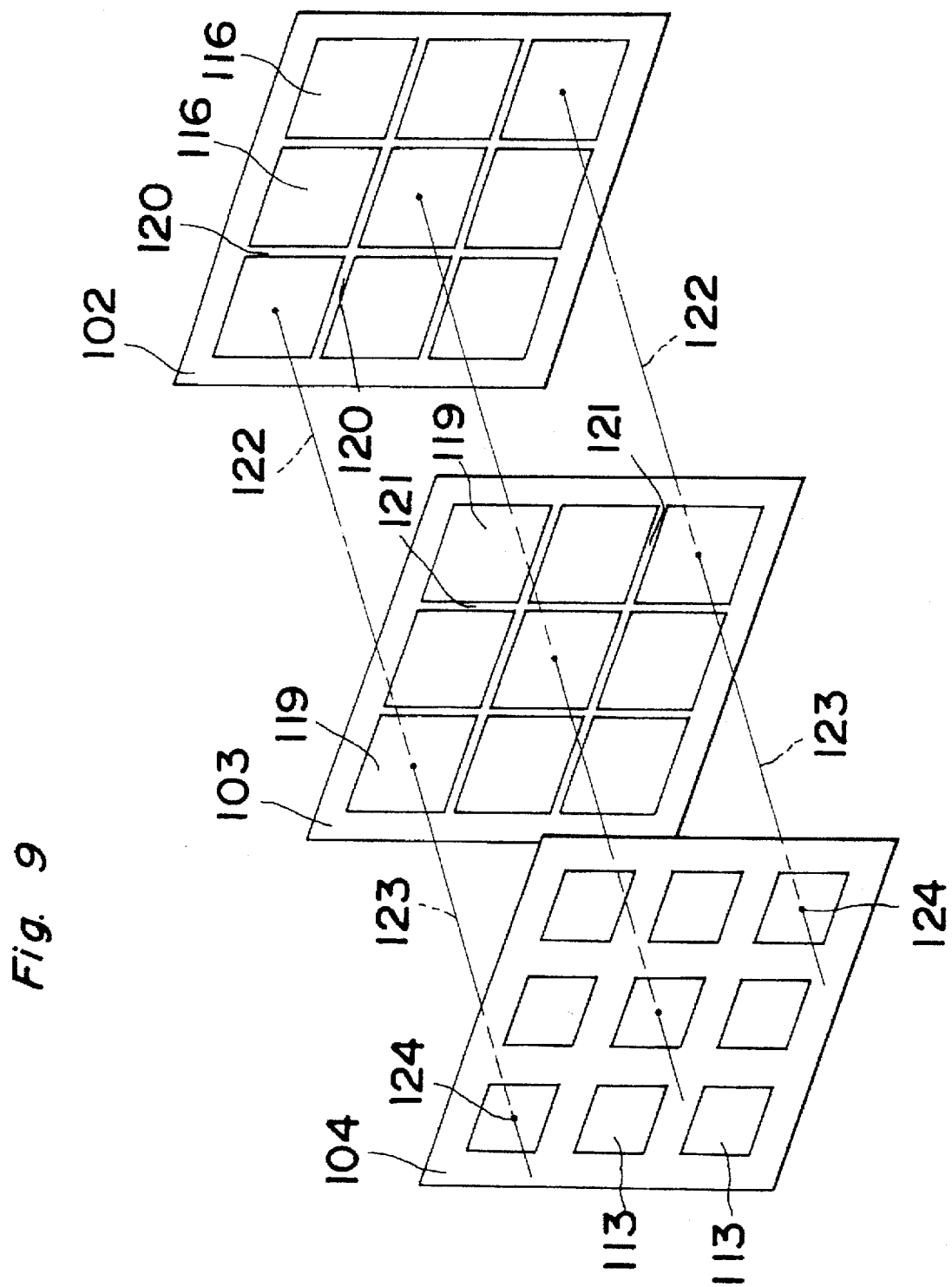
FIG. 9 is a schematic perspective diagram showing the construction of a light valve apparatus according to a first embodiment of the present invention.

The number of the pixels for the liquid crystal panel 104 is 480 horizontally×460 vertically, the dimensions of the display screen are 44.64 mm horizontally×33.58 mm vertically, and the pixel pitch is 94 µm horizontally×73 µm vertically. The pixels 113, as shown in FIG. 9, are arranged in the square form, with the size of the pixel being 53 µm horizontally×32 µm vertically, and having an aperture ratio at 25%. Each of the two glass substrates 106 and 107 has a thickness of 1.1 mm and a refractive index of 1.52.

The first lens array plate 102 is prepared by overlapping a thin transparent resin 115 on the face of the emitting side of the glass substrate 114, and a plurality of microlens elements 116 are formed in the matrix pattern on the surface thereof, while the second lens array plate 103 is prepared by also overlapping a thin transparent resin 118 on the face of the emitting side of the glass substrate 117, and a plurality of microlens elements 119 are formed in the matrix pattern on the surface thereof. The microlens elements 116 and 119 are respectively arranged in the square shape as shown in FIG. 9, and have effective regions in the rectangular shape, have an arrangement pitch of 94 µm horizontally×73 µm vertically similar to the pixel pitch of the liquid crystal panel 104, and have non-lens portions 120 and 121 of about 5 µm in width being provided between the neighboring microlens elements as shown. The first lens array plate 102 has the thickness of its glass substrate 114 at 1.1 mm, a refractive index of 1.52 and a focal length of 240 µm. The second lens array plate 103 has the thickness of its glass substrate 117 at 1.4 m, a refractive index of 1.52, and a focal length of 360 µm. The two lens array plates 102 and 103 are prepared in such a manner that an ultraviolet curing resin is applied over the glass plates 114 and 117, and molds having the surface shape of the predetermined lens array plates are overlapped thereon for irradiation of ultraviolet rays onto the ultraviolet curing resin through the glass plates 114 and 117.

The first lens array plate 102, the second lens array plate 103, and the liquid crystal panel 104 are overlapped such that the optical axis 122 of each of the microlens elements 116 for the first lens array plate 102 is aligned with the optical axis 123 of each of the microlens elements 119 of the second lens array plate 103, and the optical axes 122 and 123 pass through the center 124 of each of the pixels 113 for the liquid crystal panel 104, with a peripheral portion being fixed by a bonding agent through thin air layers provided between the lens array plates 102, 103 and the liquid crystal panel 104. The incident side polarizing plate 101 is separated from the first lens array plate 102, and the emitting side polarizing plate 105 is applied to the emitting side of the liquid crystal panel 104.

Hereinafter, a general construction of the first embodiment of a projection display system of the present invention will be explained with reference to FIG. 10.

Figure 10:
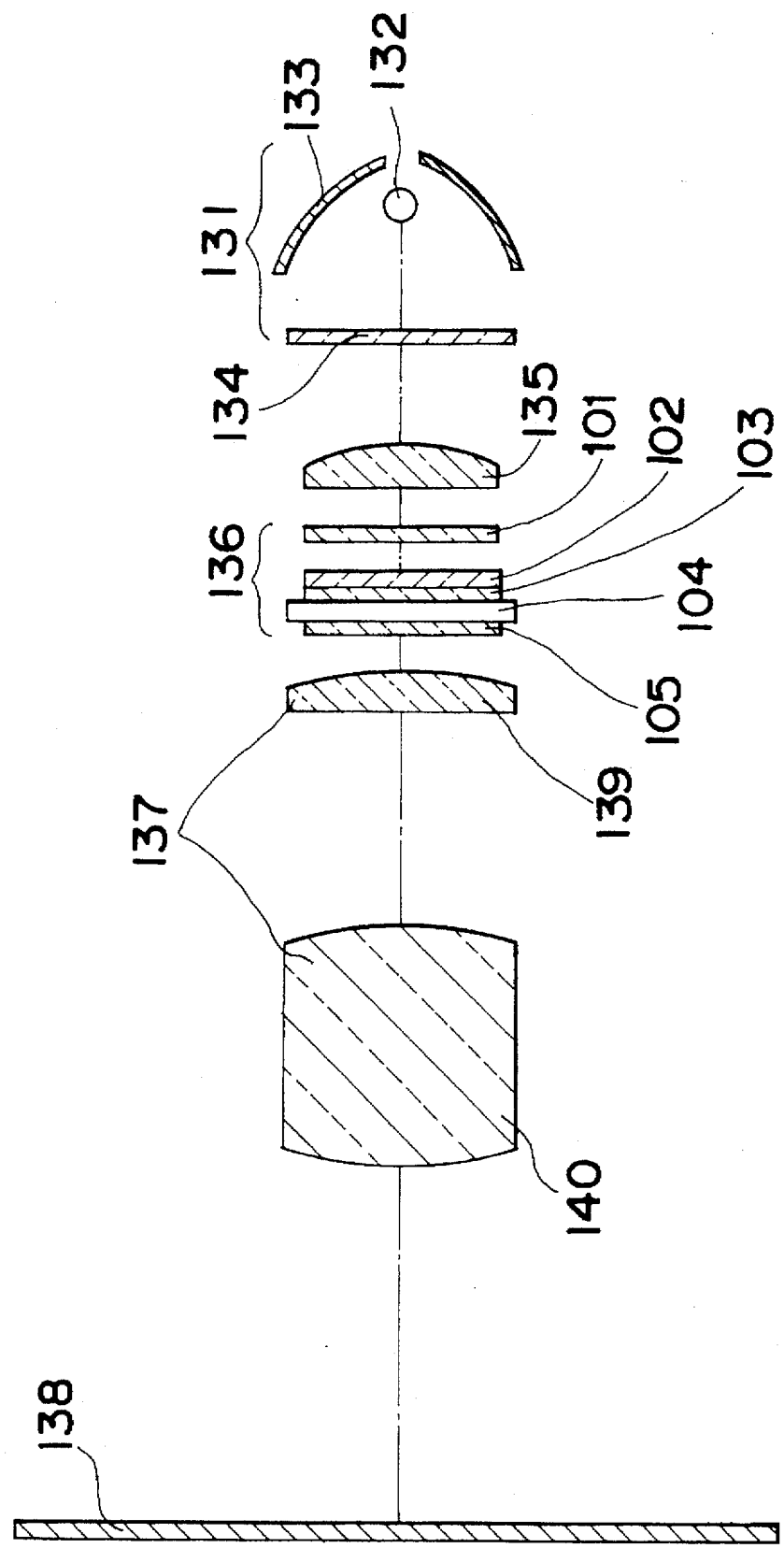
FIG. 10 is a schematic side sectional diagram showing the construction of a projection display system according to a first embodiment of the present invention.

In FIG. 10, the projection display system generally includes a light source 131, a field lens 135, a light valve apparatus 136, a projection lens assembly 137 having an auxiliary projection lens 139 and a main projection lens 140, and a projection screen 138.

The light valve apparatus 136 is similar to that as shown in FIGS. 8 and 9, and includes the incident side polarizing plate 101, first lens array plate 102, second lens array plate 103, liquid crystal panel 104, and an emitting side polarizing plate 105, all of which are sequentially disposed from the incident side.

The light source 131 further includes a halogen lamp 132, a concave mirror 133, and a filter 134. Light emitted from the lamp 132 is reflected by the concave mirror 133 and emitted in the form similar to parallel light rays. The filter 134, constituted by a glass substrate on which multi-layered films transmitting visible light and reflecting infrared rays are deposited, eliminates infrared rays from the light emitted from the concave mirror 133.

Light emitted from the light source 131 passes through the field lens 135 so as to be incident on the light valve apparatus 136, and is then incident upon the projection lens assembly 137. Thus, the images formed on the liquid crystal panel 104 are magnified and projected onto the projection screen 138 by the projection lens assembly 137. The field lens 135 is used for directing light, incident upon the pixels around the liquid crystal panel 104 from the light source 131, to be perpendicular to the liquid crystal layer 108 (FIG. 8). The projection lens assembly 137 is constituted by an auxiliary lens 139 which is disposed at the emitting side of the liquid crystal panel 104, and a main projection lens 140 which has an aperture ratio of 3.5. The auxiliary lens 139 makes the principal light rays, transmitted through all the pixels of the liquid crystal panel 104, perpendicular to the liquid crystal layer 108. Thus, light advancing along the optical axis 122 of the microlens element 116 of the first lens array plate 102 passes through the optical axis 123 of the corresponding microlens element 119 of the second lens array plate 103, and is incident upon the center 124 of the corresponding pixel 113 of the liquid crystal panel 104.

Referring back to FIG. 8, light rays 125 emitted from the light source 131 (FIG. 10) are incident on the first lens array plate 102. A very small real image corresponding to the opening portion of the concave mirror 133 is formed on the focal point 126 of each of the microlens elements 116 of the first lens array plate 102. The respective microlens elements 119 of the second lens array plate 103 form the plurality of very small light sources on the liquid crystal layer 108 of the liquid crystal panel 104 at equivalent sizes. The focal length $f_1$, of the microlens element 116 for the first lens array plate 102, and the focal length $f_2$ of the microlens element 119 for the second lens array plate 103 are adapted to satisfy the conditions of equation (5) referred to earlier. Therefore, light emitted from one microlens element 116a for the first lens array plate 102 is incident on nine microlens elements 119a, 119b and 119c for the second lens array plate 103, and light rays emitted from the nine microlens elements 119a, 119b and 119c are respectively incident upon the pixels, 113a, 113b and 113c of the liquid crystal panel 104. Incident light rays from neighboring nine microlens elements 119d, 119e and 119f of the second lens array plate 103 are incident on one pixel 113d of the liquid crystal panel 104. It is arranged such that light rays emitted from the liquid crystal panel 104 are all incident on the projection lens assembly 137. On the light valve apparatus 136, optical images are formed as the variation of the transmittance according to the video signals. Such optical images are magnified and projected by the projection lens assembly 137, whereby enlarged projection images in black and white are displayed on the projection screen.

In the case where light rays are emitted from the light source 131 and are incident upon one microlens element 116 for the first lens array 102 and are all incident upon the projection lens 137, and substantial aperture ratio of the light valve apparatus 136 may be represented by a ratio of areas on the lens face of all the microlens elements, to the area for the all region of the first lens array plate 102. The brightness at the image center of the projected image is increased by a ratio of the substantial aperture ratio with respect to the actual aperture ratio of the liquid crystal panel.

Upon experiments carried out by combining the two lens array plates 102 and 103, the brightness near the central portion of the projected image can be increased by 1.5 times that in the case where the lens array plate was not used, and thus, the effectiveness of the present invention is verified. It is to be noted here that, upon consideration that the aperture ratio of the liquid crystal panel 104 is 25%, and that the substantial aperture ratio of the lens array plates 102 and 103, neglecting the surface reflection, is theoretically 65%, the effect of the brightness improvement is considerably lower than the theoretical value. This is attributable to insufficient accuracy on the lens surfaces of the lens array plates 102 and 103.

Figure 25:
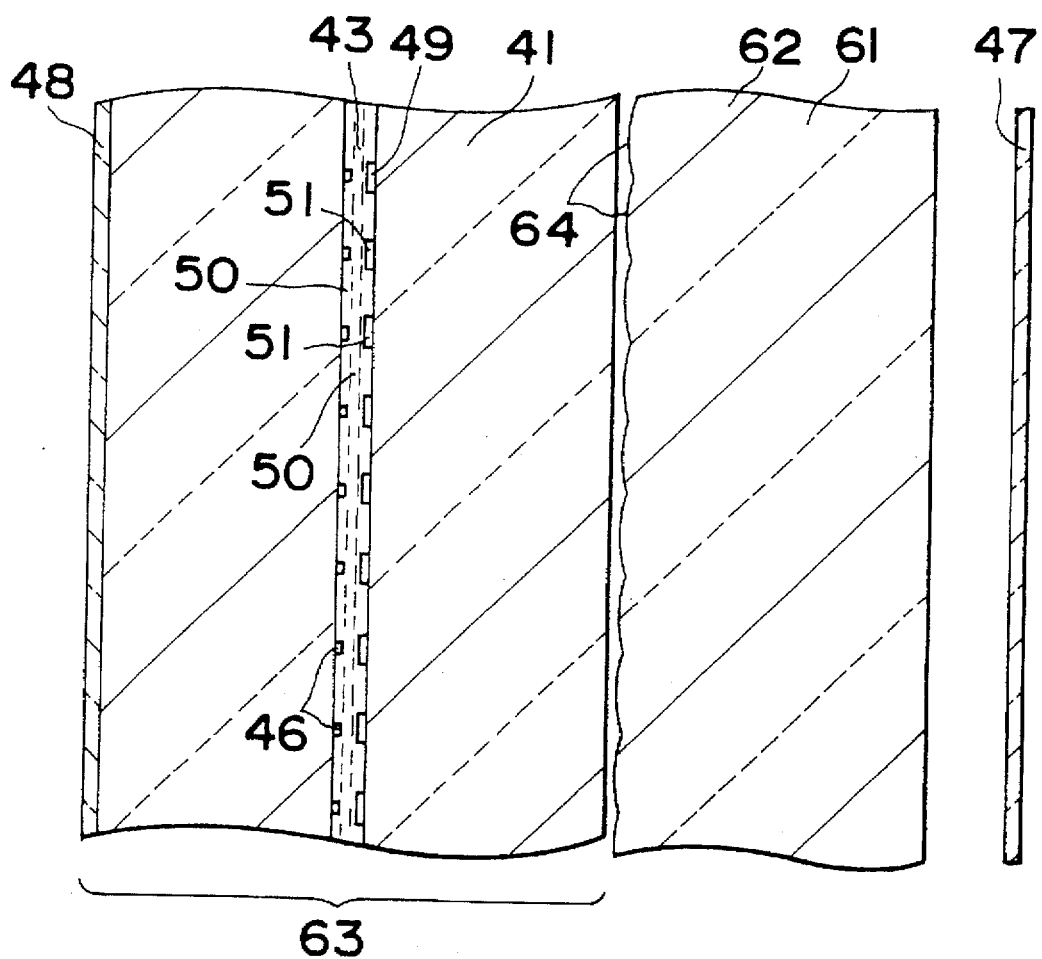
FIG. 25 is a schematic fragmentary side sectional diagram showing, on an enlarged scale, the construction of a conventional light valve apparatus (already referred to).

Although in the conventional arrangement referred to earlier in FIG. 25, it was necessary to make the incident side glass substrate of the liquid crystal panel thin in order to increase the brightness of the projected images, in the arrangement of the present invention as shown in FIG. 8, it is possible to improve the brightness of the projected image without thinning the incident side glass substrate 106 of the liquid crystal panel 104. Thus, since it is not necessary to reduce the thickness of the incident side glass substrate 106, uniformity in the thickness of the liquid crystal layer 108 can be maintained, and images at high quality may be displayed on the liquid crystal panel 104. Accordingly, by adopting the arrangement as shown in FIG. 8, projected images with high quality can be obtained with sufficient brightness.

Figure 11:
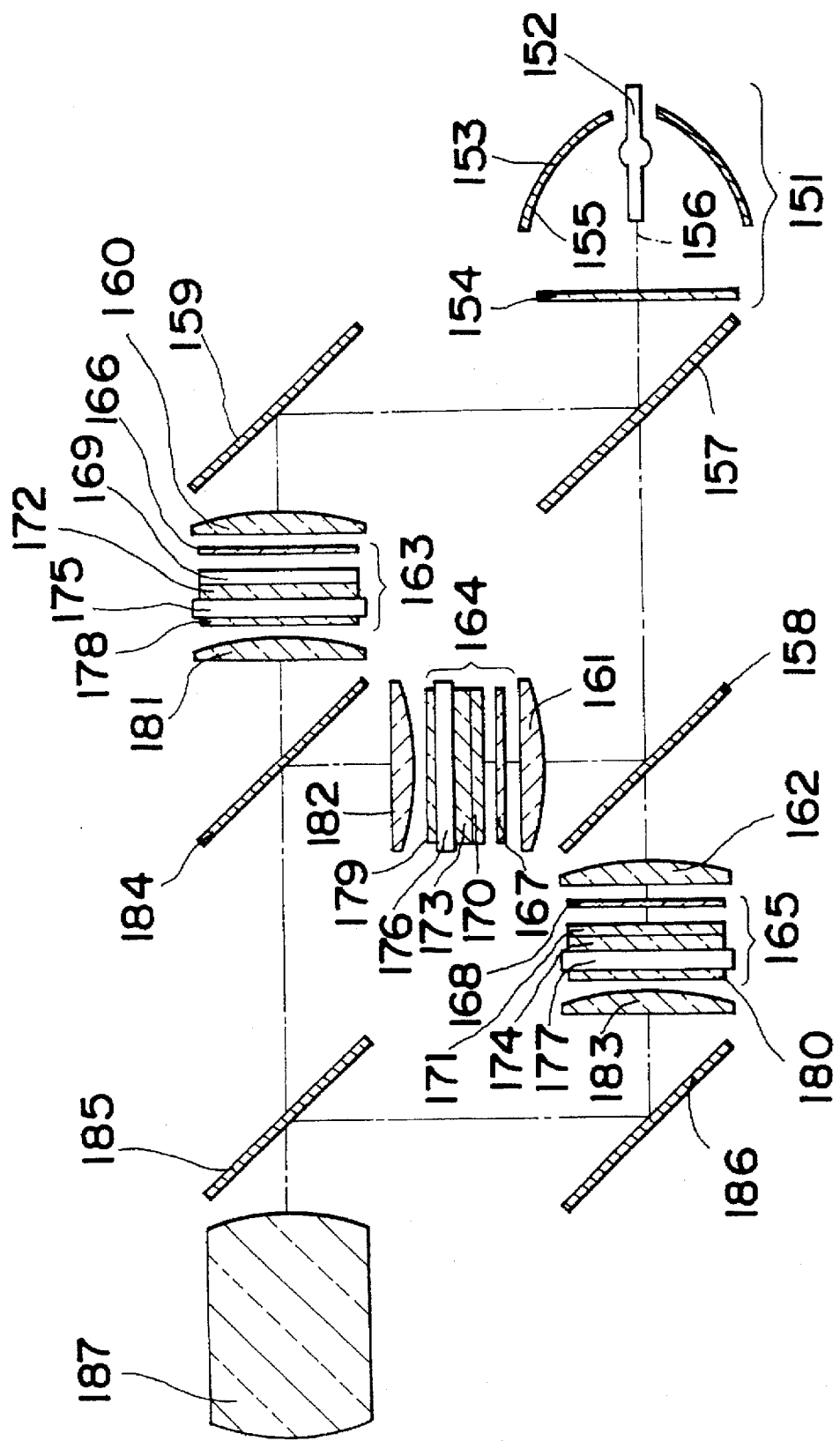
FIG. 11 is a schematic side sectional diagram similar to FIG. 10, which particularly shows a second embodiment of a projection type display system of the present invention.

FIG. 11 shows a projection display system according to a second embodiment of the present invention.

In FIG. 11, a light source 151 includes a lamp 152, a concave mirror 153, and a filter 154. The lamp 152 is of a metal halide lamp, and radiates light rays containing color components for three primary colors. The concave mirror 153 is made of glass having a reflecting face 155 in a parabolic form, on which a multi-layered film transmitting infrared rays and reflecting visible light is deposited. The filter 154 is made of a glass substrate on which a multi-layered film transmitting visible light and reflecting infrared rays and ultraviolet rays is deposited. An optical axis 156 of the concave mirror 153 is directed in a horizontal direction, and the lamp 152 is disposed with its lamp axis aligned with the optical axis 156. Radiation light of the lamp 152 is converted into light, similar to parallel light rays from which infrared rays are eliminated through reflection by the concave mirror 153, and is emitted as visible light, with infrared rays and ultraviolet rays being removed therefrom by being transmitted through the filter 154. Light emitted from the light source 151 is separated into primary colors of red, green and blue by a color separation optical system constituted by two dichroic mirrors 157 and 158 and a flat mirror 159. The respective primary colors are each transmitted through field lenses 160, 161 and 162 so as to be incident on the light valve apparatuses 163, 164 and 165.

The respective light valve apparatuses 163, 164 and 165 have the constructions similar to those as described earlier with reference to FIG. 8, and respectively include the incident side polarizing plates 166, 167 and 168, first lens array plates 169, 170 and 171, second lens array plates 172, 173 and 174, liquid crystal panels 175, 176 and 177, and emitting side polarizing plates 178, 179 and 180 as combined sequentially from the side of the light source. On each of the light valve apparatuses 163, 164 and 165, an optical image as variation of transmittance is formed according to the video signals respectively. Light rays emitted from the light valve apparatuses 163, 164 and 165 are composed into one light ray by a color combining optical system in which dichroic mirrors 184 and 185 and a flat mirror 186 are combined, after having been transmitted through auxiliary lenses 181, 182 and 183 respectively, and the composed light is incident upon a main projection lens 187.

The main projection lens 187 functions by being combined with the auxiliary lenses 181, 182 and 183, which are employed to allow the principal light rays of the projection lens 187 to pass through the liquid crystal layer perpendicularly, i.e., to improve so-called "telecentric" characteristic. Thus, the optical images formed on the three light valve apparatuses 163, 164 and 165 are magnified and projected by the main projection lens 187 onto a projection screen (not shown) located at a distant position.

When experiments were performed on the projection display apparatus as shown in FIG. 11, projection images brighter than those in the case where the lens array plates were not employed, were obtained. The uniformity of the image quality was also improved except for faulty portions which were clearly attributable to the light valve apparatuses.

Figure 12:
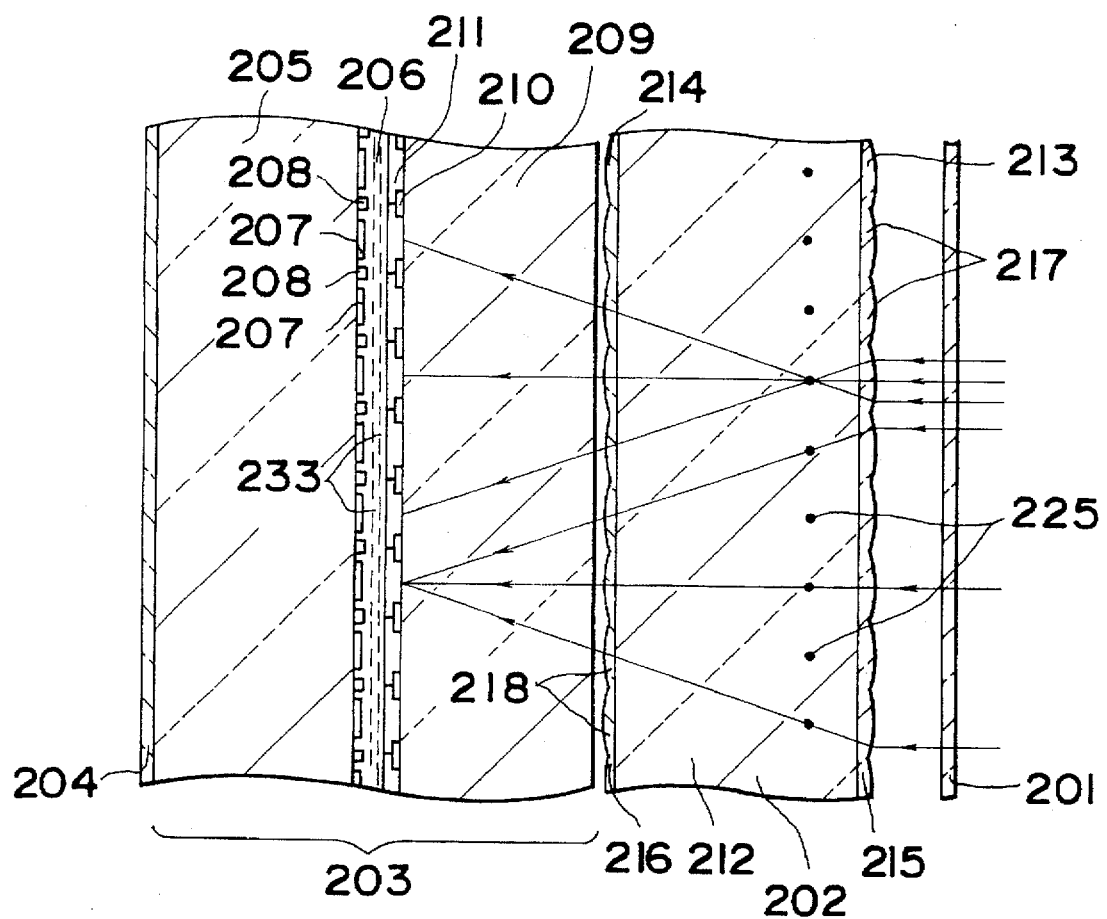
FIG. 12 is a fragmentary side sectional diagram showing on an enlarged scale, a light valve apparatus according to a second embodiment of the present invention.

FIG. 12 shows a light valve apparatus according to a second embodiment of the present invention, which generally includes an incidence side polarizing plate 201, a lens array plate 202, a liquid crystal panel 203, and an emitting side polarizing plate 204 sequentially disposed from the incident side.

Figure 13:
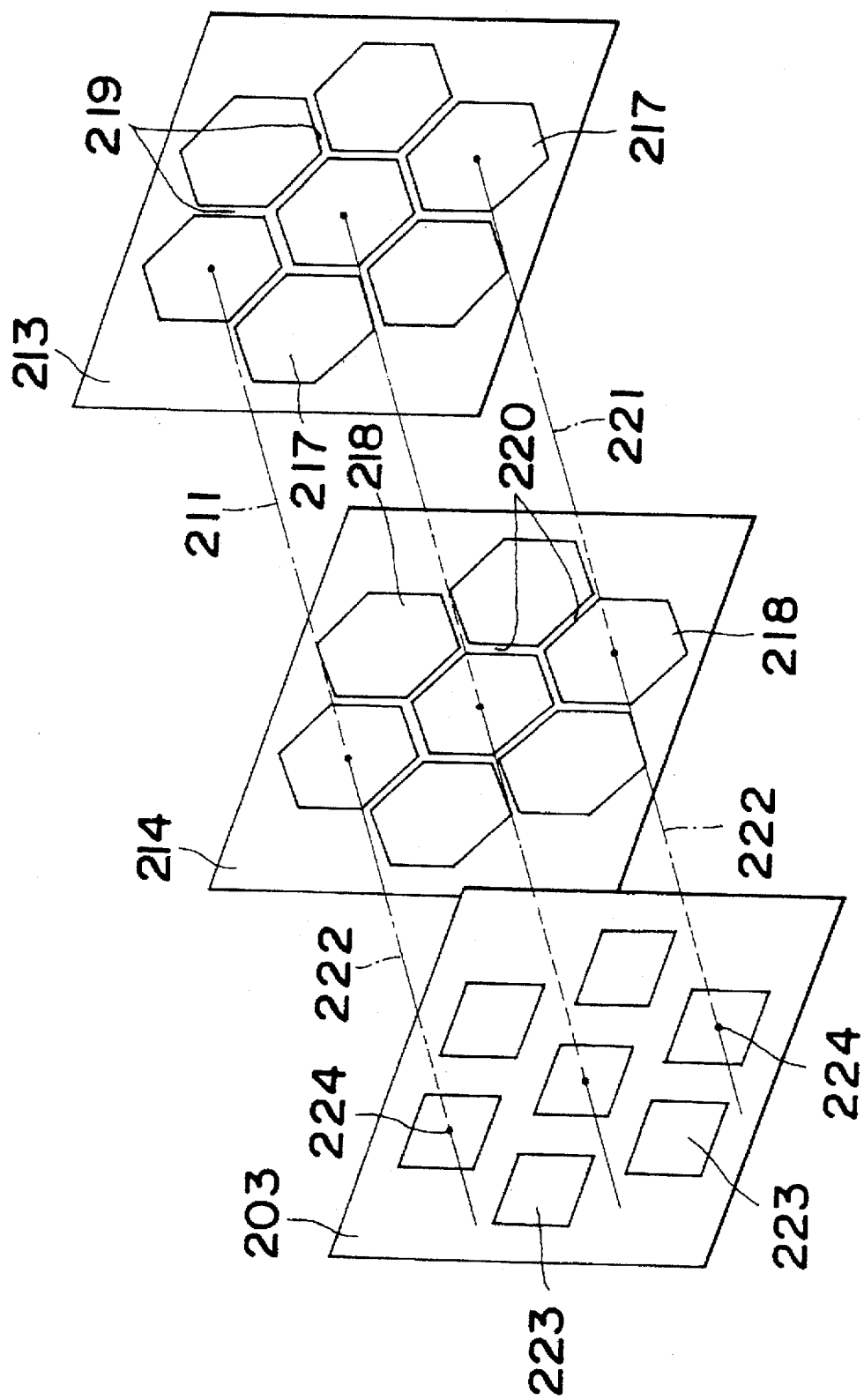
FIG. 13 is a schematic perspective diagram showing the construction of a light valve apparatus according to a second embodiment of the present invention.

The liquid crystal panel 203 is a TFT liquid crystal panel employing the TN liquid crystals similar to that described earlier with reference to FIG. 8, and has a pixel arrangement as shown in FIG. 13. At the side of the liquid crystal layer 206 of the emitting side glass substrate 205, there are provided pixel electrodes 207 and TFT 208. Furthermore, at the side of the liquid crystal 206 of the incident side glass substrate 209, a black matrix 210 is provided to shield the TFT against light, and a color filter 211 in a mosaic pattern is disposed, with a common electrode being further provided thereon.

The number of pixels for the liquid crystal panel 203 is 480 horizontally×460 vertically, the dimensions of the display screen are 30.7 mm horizontally×23.0 mm vertically, and the pixel pitch is 64 µm horizontally×50 µm vertically. The size of the pixel is 33 µm horizontally×29 µm vertically, and the aperture ratio at 25%. The incident side glass substrate has a thickness of 1.1 mm and refractive index of 1.82.

The lens array plate 202 has a first lens array 213 formed on the face of an incident side of a glass substrate 212, and a second lens array 214 is formed on the face of an emitting side. The first lens array 213 and the second lens array 214 are respectively prepared by overlapping thin transparent layers 215 and 216 on the glass substrate 212, and forming convex lens surfaces 217 and 218 thereon. As shown in FIG. 13, each of the microlens elements 217 and 218 has an effective region of a hexagonal shape, and these lens elements 217 and 218 are arranged in a delta form at a pitch equal to that of the liquid crystal panel 203. The non-lens portions 219 and 220 are of 5 µm in width and are provided between the neighboring microlens elements as shown. The optical axis 221 of each of the microlens elements 217 is aligned with the optical axis 222 of the corresponding microlens elements 218. The glass substrate 212 has a thickness of 1.4 mm and a refractive index of 1.52, and the focal length of the first lens array 213 is 240 µm, and that of the second lens array 214 is 360 µm.

The lens array plate 202 and the incident side glass substrate 209 of the liquid crystal panel 203 are bonded at the peripheral edge portions with a thin air layer being held therebetween. In this embodiment, the optical axes 221 and 222 of the respective microlens elements 217 and 218 for the lens array plate 202 pass through the centers 224 of the corresponding pixels 223 of the liquid crystal panel 203. The arrangement as shown in FIG. 12 provides better transmittance, since the boundary face having a difference in the refractive index is smaller than in the arrangement which employs two lens array plates.

Furthermore, the image of an imaginary object located on the focal point 225 of the microlens element 217 for the first lens array 213 is formed on the pixel 223 of the liquid crystal panel 203 by the second lens array 214. Light emitted from one microlens element 217 of the first lens array 213 is incident upon seven normal lens elements 218 for the second lens array 214, and light emitted from the seven microlens elements for the second lens array 214 is incident on one pixel 223 of the liquid crystal panel 203. Thus, similar to the previous embodiment, the substantial aperture ratio may be improved by the lens array plate 202.

When the light valve apparatus for the projection display system described earlier with reference to FIG. 10 is replaced by the light valve apparatus of FIG. 12, a projection image in full color can be obtained. As a result of experiments, brightness in the vicinity of the central portion of the projected image approached about 1.5 times that as in the case where the lens array plate was not provided.

Next, an embodiment in which the light valve apparatus of the present invention has been applied to a view-finder system will be explained with reference to FIG. 14.

Figure 14:
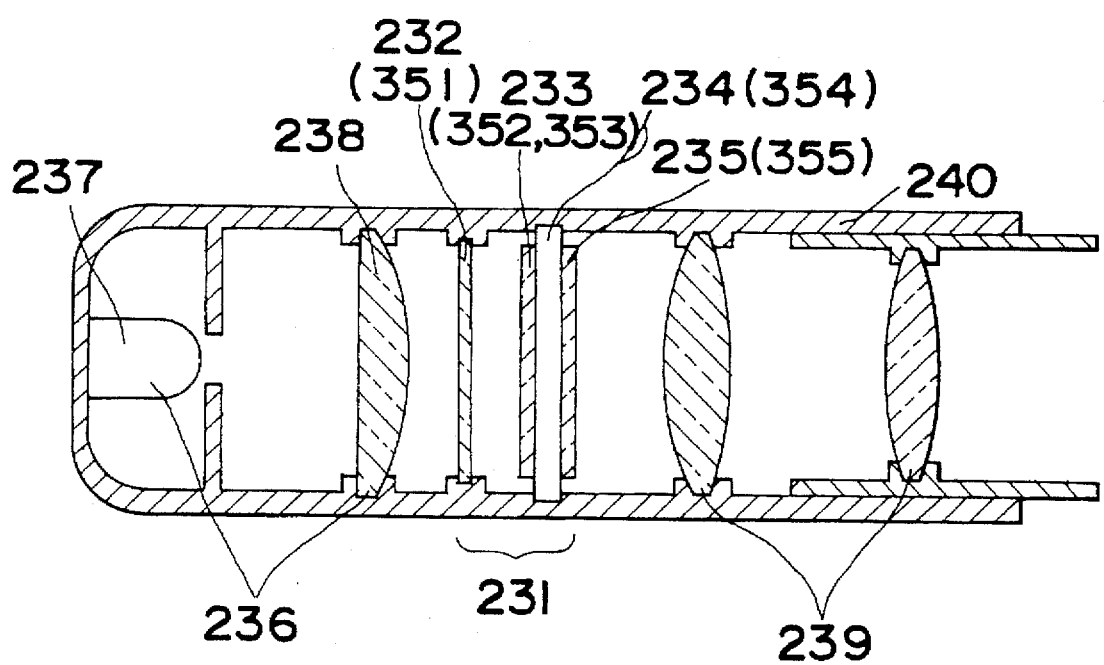
FIG. 14 is a schematic side sectional diagram showing the construction of a view-finder system according to an embodiment of the present invention.

In FIG. 14, the view-finder system generally includes a casing 240, a light valve apparatus 231, a light source 236, and an eyepiece 239 which are enclosed in the casing 240 as described below.

Although the dimensions of respective parts differ, the light valve apparatus 231 has a construction similar to that described earlier with reference to FIG. 12, and comprises an incident side polarizing plate 232, a lens array plate 233, a liquid crystal panel 234, and an emitting side polarizing plate 235 sequentially disposed from the incident side. The liquid crystal panel 234 is a TFT liquid crystal panel employing the TN liquid crystals similar to that as described earlier with reference to FIG. 12. Also incorporated is a color filter in a mosaic form. The display size is 0.7 of an inch, and an image in full color is displayed.

The number of pixels for the liquid crystal panel 234 is 372 horizontally×238 vertically, and the pixel pitch is 38 µm horizontally×44 µm vertically. The size of the pixel is 18 m horizontally×24 m vertically, with an aperture ratio at 25%. Each of the glass substrates for the liquid crystal panel has a thickness of 1.1 mm and a refractive index of 1.52. The lens array substrate has a thickness of 1.3 mm, and the focal length of the first lens array is 100 µm, and that of the second lens array is 360 µm.

The light source 236 is constituted by a lamp 237 and a condenser lens 238. The lamp 237 is a fluorescent lamp having a diameter of 7 mm and a length of 20 mm which is powered by a DC voltage, and light irradiated from the lamp 237 is converted into a light ray with a narrow directivity by the condenser lens 238 so as to be incident upon the light valve apparatus 231, and light emitting therefrom is further incident on the eye-piece 239. When an observer (not shown) looks into the eye-piece 239, a magnified virtual image of the image on the light valve apparatus 231 can be viewed. For the lamp 237, a light source having a high brightness with a small light emitting member such as an LED, halogen lamp, cathode ray tube or the like may be employed.

In the view-finder system shown in FIG. 14, the substantial aperture ratio of the light valve apparatus is increased by employing the lens array, and consequently, light utilizing efficiency can also be increased. Accordingly, power consumption of the lamp may be reduced, and the continuous operation time without requiring a recharge of a battery is prolonged as compared with the case where the lens array is not employed.

Figure 15:
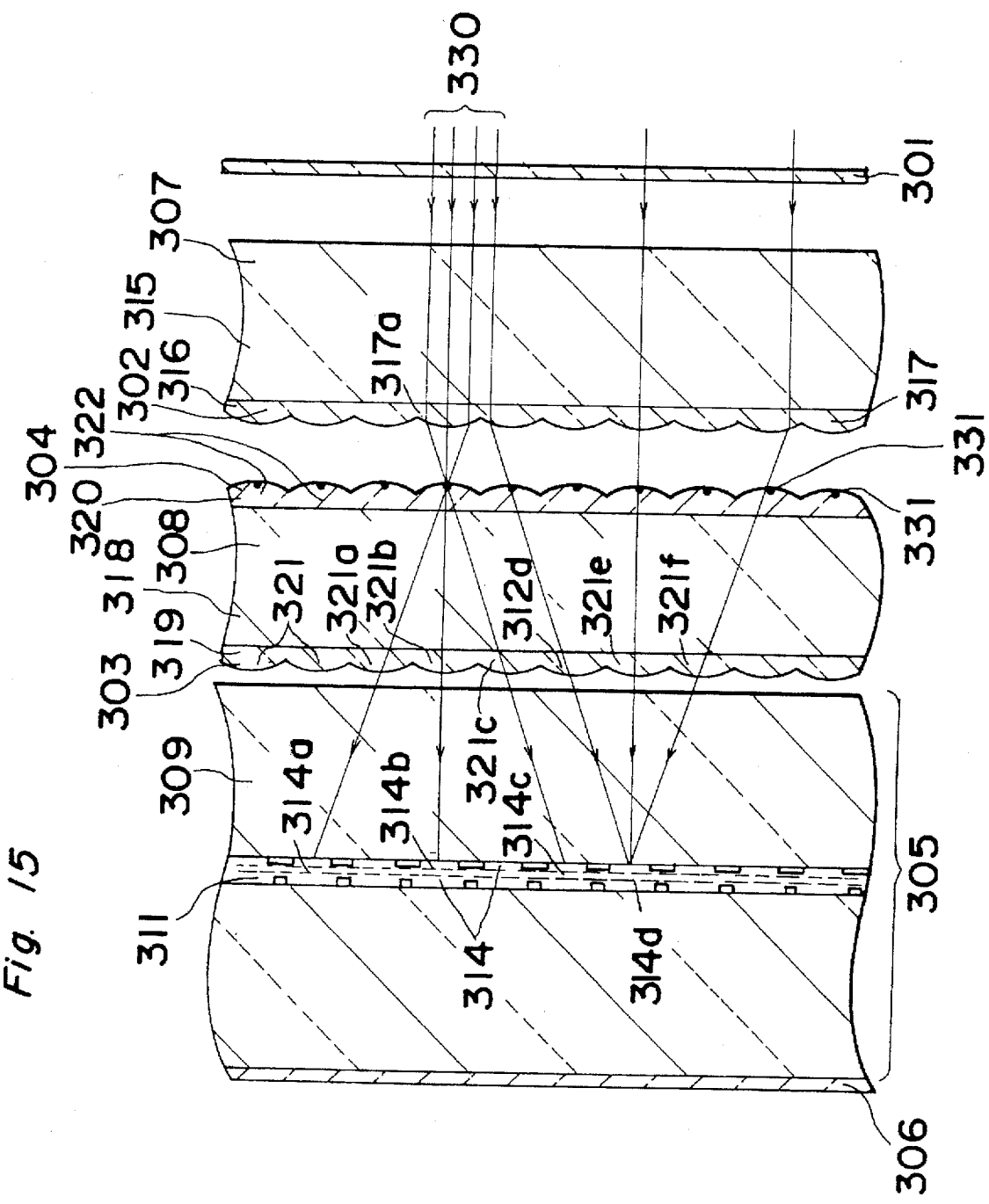
FIG. 15 is a schematic fragmentary side sectional diagram showing the construction of a light valve apparatus according to another embodiment of the present invention.

Reference is now made to FIG. 15 which shows the construction of a light valve apparatus according to a third embodiment of the present invention.

In FIG. 15, the light valve apparatus of the present invention generally includes an incident side polarizing plate 301, a first lens array plate 307, a second lens array plate 308, a liquid crystal panel 305, and an emitting side polarizing plate 306 sequentially arranged from the incident side as shown.

The liquid crystal panel 305 has a construction similar to that as described earlier with reference to FIG. 8.

Figure 16:
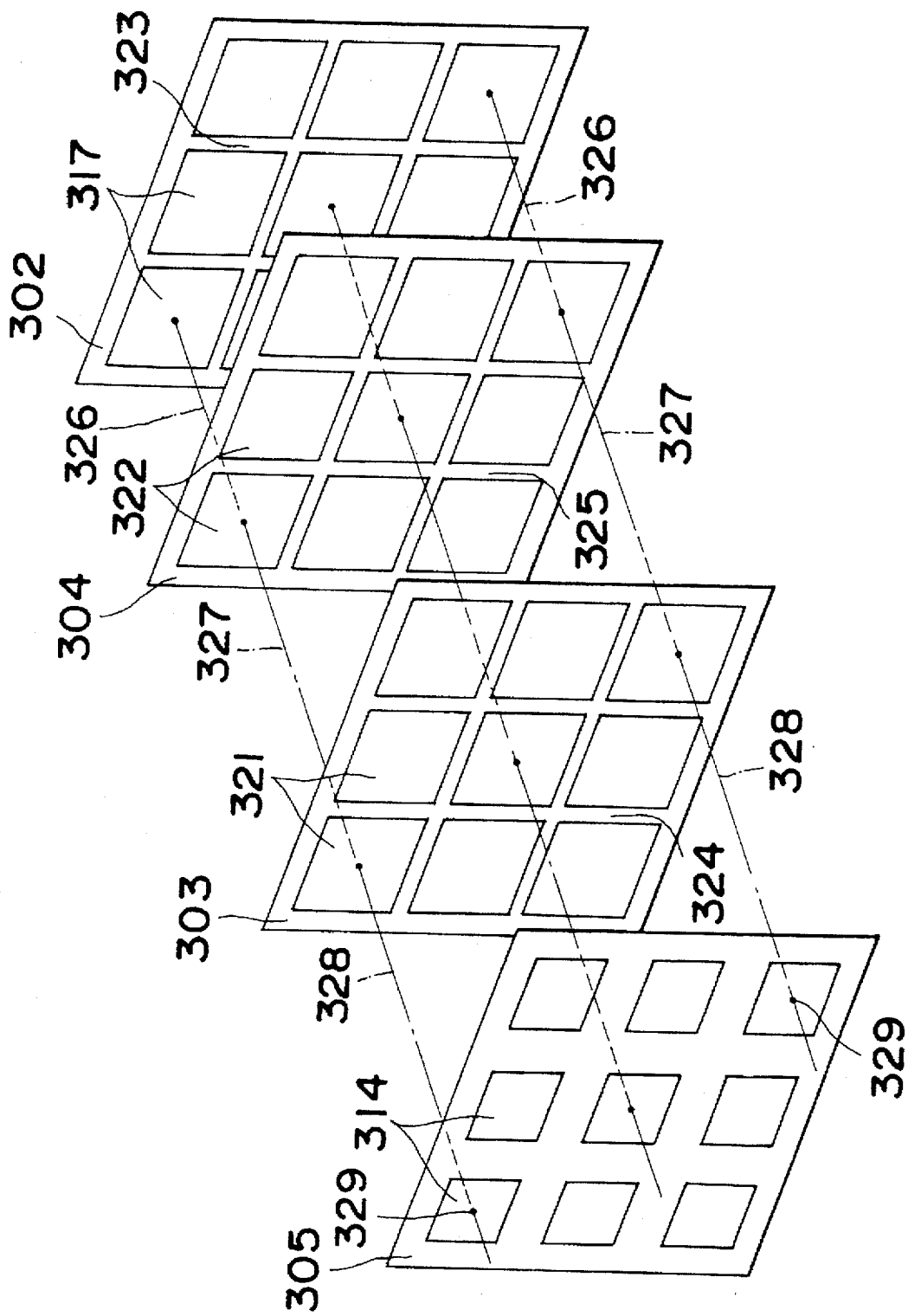
FIG. 16 is a schematic perspective diagram showing the construction of a light valve apparatus according to another embodiment of the present invention.

The first lens array plate 307 is prepared by overlapping a thin transparent resin 316 on the face of the emitting side of the glass substrate 315, and a plurality of microlens elements 316 are formed in the matrix pattern on the surface. The second lens array plate 308 is prepared also by overlapping a thin transparent resin 319, and 320 on the face of the emitting side and incident side face of the glass substrate 318, and a plurality of microlens elements 321 and 322 are formed in the matrix pattern on the surface. The microlens elements 317, 321 and 322 are respectively arranged in the square shape as shown in FIG. 16, and have an effective area in the shape of a rectangle. The pitch of the elements is 94 µm horizontally×73 µm vertically similar to the pixel pitch of the liquid crystal panel 305, with non-lens portions 323, 324 and 325 having about 5 µm in width and being provided between the neighboring microlens elements as shown. The first lens array plate 307 has a thickness of its glass substrate 315 of 1.1 mm, a refractive index of 1.52 and a focal length of each of the microlens elements 317 of the first lens array 302 of 240 µm. The second lens array plate 308 has a thickness of its glass substrate 318 of 1.1 mm, a refractive index of 1.52, and a focal distance of each of the microlens elements 321 of the second lens array 303 of 360 µm. The focal length of each of the microlens elements 322 for the third lens array 304 is 120 µm. The three lens arrays 302, 303 and 304 are each prepared in such a manner that an ultraviolet curing resin is applied over the glass substrates 315 and 318, and molds having the surface shape of the predetermined lens array plates are overlapped thereon for irradiation of ultraviolet rays onto the ultraviolet curing resin through the glass substrates 315 and 318.

The first lens array 302, the second lens array 303, the third lens array 304 and the liquid crystal panel 205 are disposed such that the optical axis 326 of each of the microlens elements 317 for the first lens array 302, the optical axis 327 of each of the microlens elements 327 for the third lens array 304, and the optical axis 328 of each of the microlens elements 321 of the second lens array 303 are aligned respectively, and the optical axes 326, 327 and 328 pass through the center 329 of each of the pixels 314 for the liquid crystal panel 305. The peripheral portion is fixed by an bonding agent through thin air layers provided between the incident side glass substrate 309 of the liquid crystal panel 305 and the second lens array plate 308. The first lens array plate 307 and the second lens array plate 308 are provided with a spacer of 0.32 mm at edge potions which are fixed by a bonding agent. The incident side polarizing plate 301 is separated from the first lens array plate 307, and the emitting side polarizing plate 306 is applied to the emitting side of the liquid crystal panel 305.

When the light valve apparatus of the projection display system referred to earlier with reference to FIG. 10 is replaced by the light valve apparatus as shown in FIG. 15, projection images may be obtained.

Next, functions of the arrangement shown in FIGS. 15 and 16 will be described.

As shown in FIG. 15, light rays 330 emitted from the light source are incident on the first lens array plate 302. At the focal points 331 of each of the microlens elements 317 of the first lens array plate 302, a very small real image corresponding to the opening of the concave mirror of the light source is formed. The respective microlens elements 321 of the second lens array plate 303 forms the plurality of very small light sources on the liquid crystal layer 311 of the liquid crystal panel 305 having an equal size. The focal length $f_1$ of the microlens element 317 for the first lens array plate 302, and the focal length $f_2$ of the lens element 321 for the second lens array plate 303 are adapted to satisfy the conditions of equation (5) referred to earlier. Therefore, light emitted from one lens element 317a for the first lens array plate 302 is incident on nine lens elements 321a, 321b and 321c for the second lens array plate 303, and light rays emitted from the nine lens elements 321a, 321b and 321c are respectively incident upon the pixels 314a, 314b and 314c of the liquid crystal panel 305. On one pixel 314d of the liquid crystal panel 305, incident light rays from the neighboring nine microlens elements 321d, 321e and 321f of the second lens array plate 303 are incident. The light rays emitted from the liquid crystal panel 305 are all incident on the projection lens. Optical images are formed as the variation of the transmittance according to the video signals on the light valve apparatus. Such optical images are magnified and projected by the projection lens assembly, whereby enlarged projection images in black and white are displayed on the projection screen.

In the case where light rays are emitted from the light source and are incident upon one lens element 317 for the first lens array 302, and are all incident upon the projection lens, a substantial aperture ratio of the light valve apparatus may be represented by a ratio of areas of the lens face of all the microlens elements to the area for the entire region of the first lens array plate 302. The brightness at the image center of the projected image is increased by a ratio of the substantial aperture ratio with respect to the actual aperture ratio of the liquid crystal panel. Furthermore, high quality images may be displayed on the projection screen since it is not necessary to reduce the thickness of the incident side glass substrate 309 of the liquid crystal panel 305, similar to the case of FIG. 8.

When experiments were carried out by combining the two lens array plates 307 and 308, the brightness near the central portion of the projected images were increased in comparison to the case where the lens array plate was not used, and thus, the effectiveness of the present invention could be verified.

Projected images in full color may also be obtained when the light valve apparatus for the projection display system of FIG. 11 is replaced by the light valve apparatus of FIG. 15. In this case, projected images which are brighter than those in the case where the two lens array plates were not employed, could be obtained.

Figure 17:
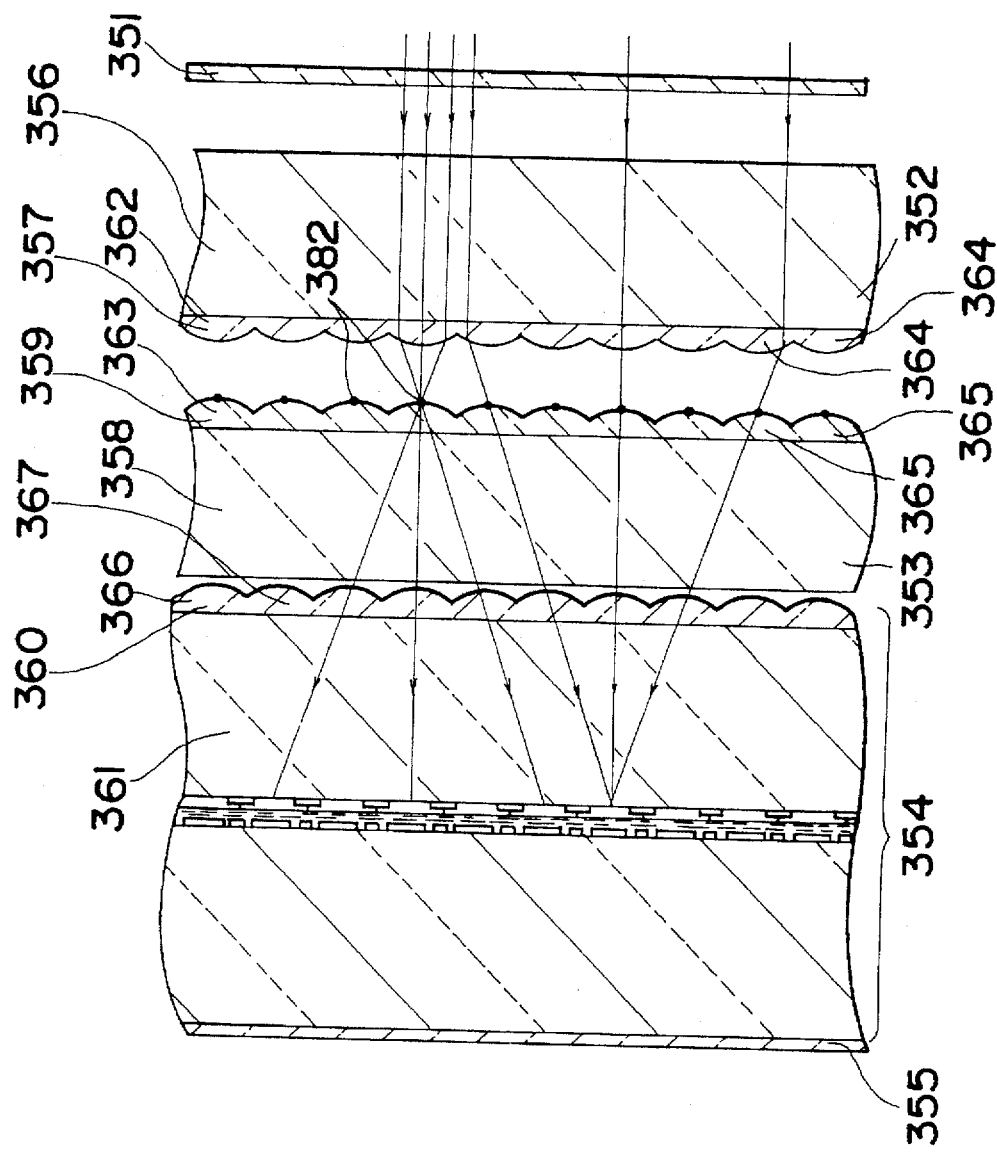
FIG. 17 is a schematic fragmentary side sectional diagram showing the construction of a light valve apparatus according to a third embodiment of the present invention.

FIG. 17 shows the construction of a light valve apparatus according to a fourth embodiment of the present invention.

As shown in FIG. 17, the light valve apparatus of the present invention generally includes an incident side polarizing plate 351, a first lens array plate 352, a second lens array plate 353, a liquid crystal panel 354, and an emitting side polarizing plate 355 sequentially arranged from the incident side as shown. The liquid crystal panel 354 is similar in construction to that as described earlier with reference to FIG. 12.

The first lens array plate 352 has a first lens array 357 formed on the face of an emitting side of a glass substrate 356, and a second lens array plate 353 has a third lens array 359 formed on the face of an incident side of a glass substrate 358. The second lens array 360 is formed on the face of an incident side of an incident side glass substrate 361 of the liquid crystal panel 354. The first lens array 357 and the third lens array 359 are respectively prepared by overlapping thin transparent layers 362 and 363 on the glass substrates 356 and 358, thus forming convex lens surfaces 364 and 365. The second lens array 360 is prepared by overlapping a thin transparent resin 366 on the incident side glass substrate 361, thus forming convex lens surfaces 367 thereon. As shown in FIG. 18, each of the microlens elements 364, 365, and 367 has an effective region having a hexagonal shape, and these lens elements 363, 364, and 366 are arranged in a delta form having a pitch equal to that of the liquid crystal panel 354, with non-lens portions 368, 369 and 370 of 5 μm in width and being provided between the neighboring microlens elements as shown. The optical axis 377 of each of the microlens elements 364 of the first lens array 357 is aligned with the optical axis 378 of the corresponding microlens elements 365 of the third lens array 359, and is also aligned with the optical axis 379 of each of the microlens elements 367 of the second lens array 360.

Each of the glass substrates 356 and 358 has a thickness of 1.1 mm and a refractive index of 1.52. The focal length of the first lens array 357 is 240 μm, the focal length of the second lens array 360 is 360 μm, and the focal length of the third lens array 359 is 120 μm.

The second lens array plate 353 and the incident side glass substrate 361 of the liquid crystal panel 354 are bonded by a bonding agent at the peripheral edge portions, with a thin air layer being held therebetween. The second lens array plate 353 and the first lens array plate 352 are provided with a spacer of 0.35 mm in thickness around the peripheral portions for fixing by a bonding agent. In this case, the optical axis 377 of each of the microlens elements 364 for the first lens array 357 is aligned with the optical axis 378 of each of the microlens elements 365 for the third lens array 359, and with the optical axis 379 of each of the microlens elements 367 of the second lens array 360. The optical axes 377, 378 and 379 pass through centers 381 of the corresponding pixels 380 of the liquid crystal panel 354.

Furthermore, the image of an imaginary object located at the focal point 382 of the microlens elements 364 for the first lens array 357 is formed on the pixel 380 of the liquid crystal panel 354 by the second lens array 360. Light emitted from one microlens element 364 of the first lens array 357 is incident upon seven microlens elements 366 for the second lens array 360, and light emitted from the seven microlens elements for the second lens array 360 is incident on one pixel 380 of the liquid crystal panel 354. Moreover, light rays passing through the edge portion of the very small light sources formed by the respective microlens elements 364 for the first lens array 357 are also incident upon the respective corresponding microlens elements 367 for the second lens array 360 by the respective microlens elements 365 for the third lens array 359. Therefore, utilization efficiency of the light rays is improved, and brighter projection images can be obtained. Thus, in a similar manner as in the previous embodiment, the substantial aperture ratio may be improved by the three sets of the lens arrays 357, 359 and 360.

When the light valve apparatus for the projection display system described earlier, with reference to FIG. 10, is replaced by the light valve apparatus of FIG. 17, a projection image in full color can be obtained.

Next, a further embodiment, in which the light valve apparatus of the present invention is applied to the view-finder system of the present invention, will be described with reference to FIG. 14. Although the dimensions of respective parts differ, the light valve apparatus generally has a construction similar to that as shown in FIG. 17, and includes the incident side polarizing plate 351, the first lens array plate 352, the second lens array plate 353, a liquid crystal panel 354, and an emitting side polarizing plate 355 sequentially arranged from the incident side as shown (indicated by numerals in parentheses). The liquid crystal panel 354 is similar to that of the light valve apparatus described earlier with reference to FIG. 14.

Each of the glass substrates for the lens array plates has a thickness of 1.1 mm and a refractive index of 1.52. The focal length of the first lens array is 240 μm, the focal length of the second lens array is 360 μm, and the focal length of the third lens array is 120 μm.

In the case where the light valve apparatus of the view finder system as shown in FIG. 14 is replaced by the aforementioned light valve apparatus, magnified images in full color are produced.

In the view-finder system, since the substantial aperture ratio is increased by the employment of the lens array, the light utilizing efficiency can be increased, and consequently, power consumption for the lamp can be decreased. Thus, the continuous operation time without requiring a charging of the battery can be prolonged as compared with the case where the lens array is not employed.

Next, other embodiments of the light valve apparatus according to the present invention will be described.

In FIGS. 8 and 12, although the arrangement only shows the optical axis of each of the microlens elements for the first lens array as being aligned with the optical axis of each of the corresponding microlens elements for the second lens array, it is possible to adopt arrangements other than the above.

Figure 19A:
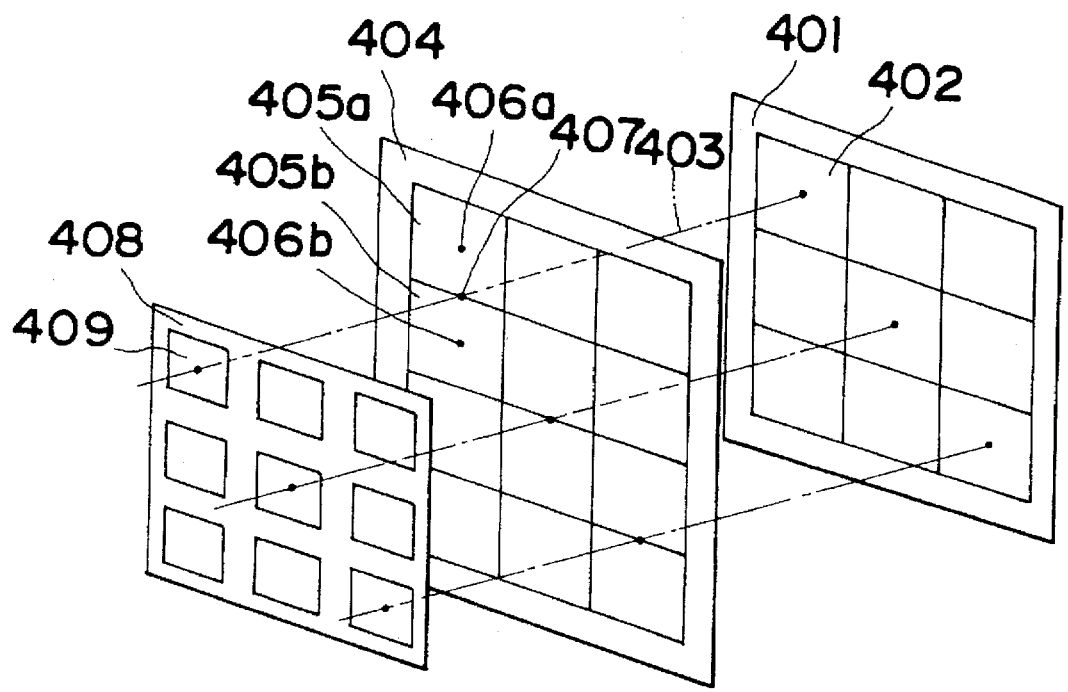

By way of example, as shown by the arrangement in FIG. 19(a), an optical axis 403 of the microlens element 402 for a first lens array 401 passes through a center point 407 of a straight line which connects the centers 406a and 406b of the neighboring two microlens elements 405a and 405b for a second lens array 404. However, in this case, the optical axis 403 is required to pass through the pixel 409 of the liquid crystal panel 408.

Figure 19B:
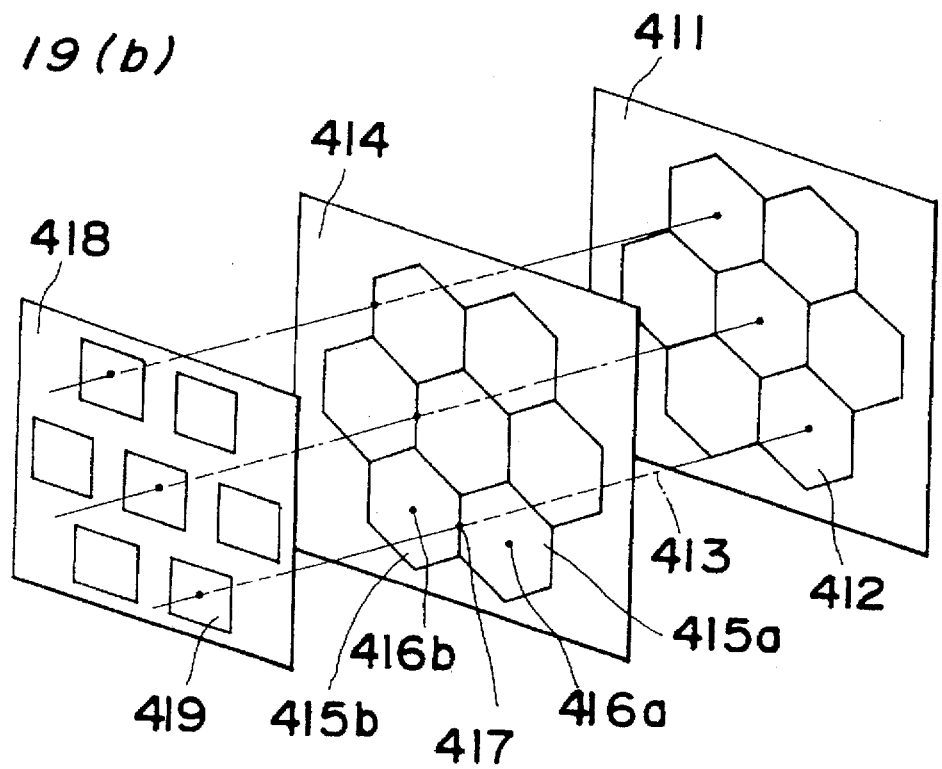

In the case where the pixels of the liquid crystal panel are of the delta disposition, the arrangement may be made as shown in FIG. 19(b) such that an optical axis 413 of the microlens element 412 for a first lens array 411 passes through a center point 417 of a straight line which connects the centers 416a and 416b of the neighboring two microlens elements 415a and 415b for a second lens array 414 and also passes through the pixel 419 of the liquid crystal panel 418.

Figure 20A:
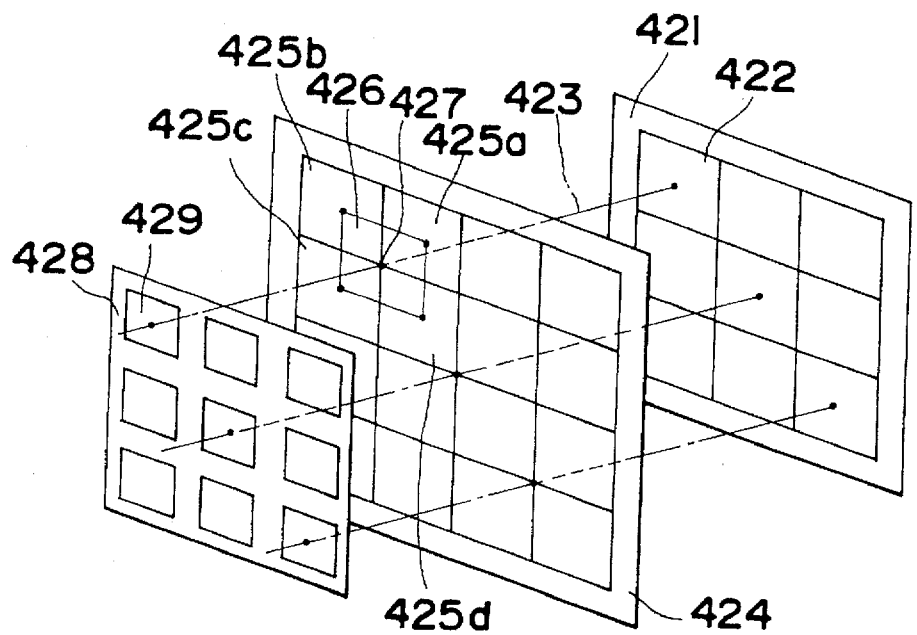
FIGS. 20(a) and 20(b) are schematic perspective diagrams showing the constructions of light valve apparatuses according to embodiments of the present invention.

In the case where the pixels of the liquid crystal panel are of the square disposition, the arrangement as shown in FIG. 20(a) can be made such that an optical axis 423 of the microlens element 422 for a first lens array 421 passes through a center 427 of a rectangle 426 formed by lines, thereby connecting centers of the neighboring four microlens elements 425a, 425b, 425c, and 425d of the second lens array 424, and also, through the pixel 429 of the liquid crystal panel 428.

Figure 20B:
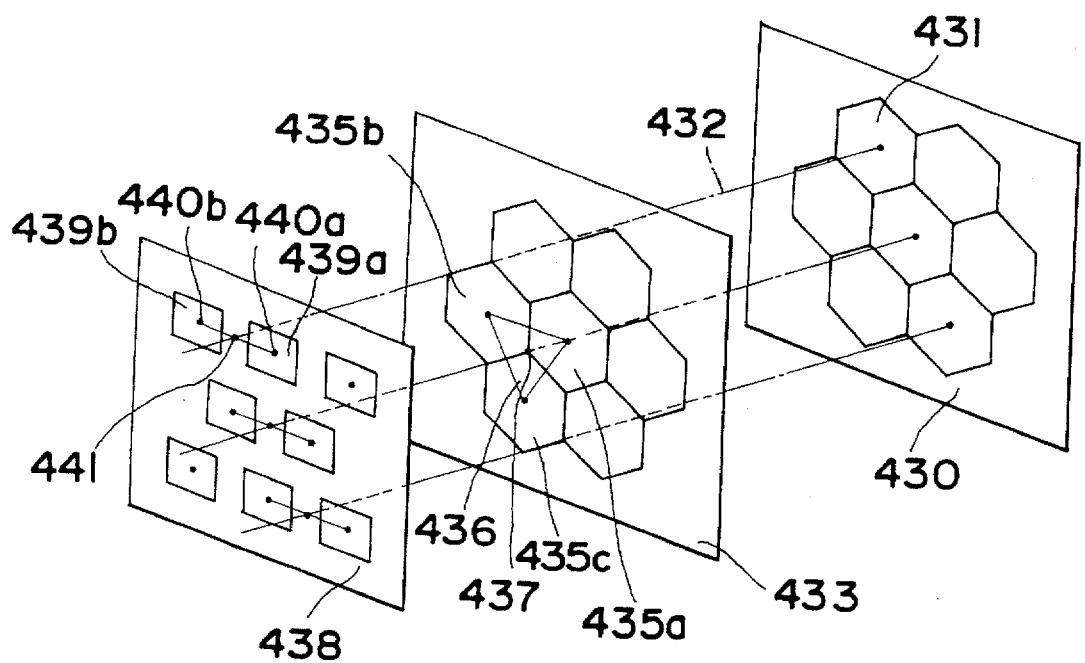

Meanwhile, in the case of the delta disposition, an arrangement as shown in FIG. 20(b) may be adopted in which an optical axis 432 of the microlens element 431 for a first lens array 430 passes through an outer center 437 of a triangle 436 constituted by lines connecting centers of neighboring three microlens elements 435a, 435b and 435c for the second lens array 433, and also, passes through a center point 441 of a line connecting centers 440a and 440b of the pixels 439a and 439b of the liquid crystal panel 438. In any of the above cases, the real image of the very small light source formed on the focal point of each of the microlens element for the first lens array can be formed on each of the pixels of the liquid crystal panel by the second lens array.

In FIGS. 15 and 17, although an arrangement has been shown in which the optical axis of each of the microlens elements for the first lens array is aligned with the optical axes of the corresponding microlens elements for the second and third lens arrays, it is possible to adopt the arrangements other than the ones detailed above.

Figure 21:
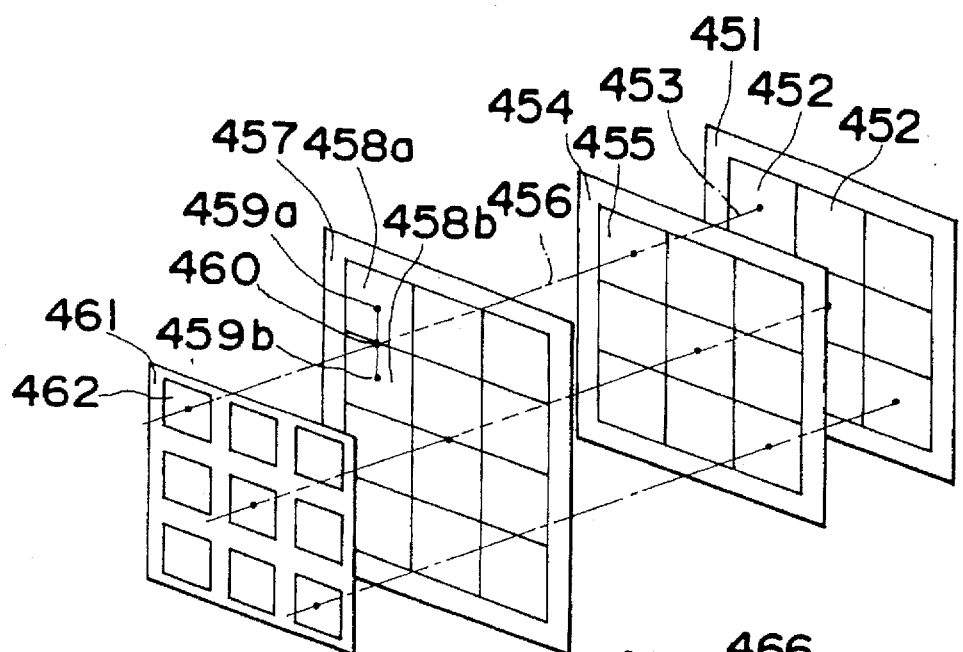
FIGS. 21(a) and 21(b) are schematic perspective diagrams showing the constructions of light valve apparatuses according to further embodiments of the present invention.
Figure 21:
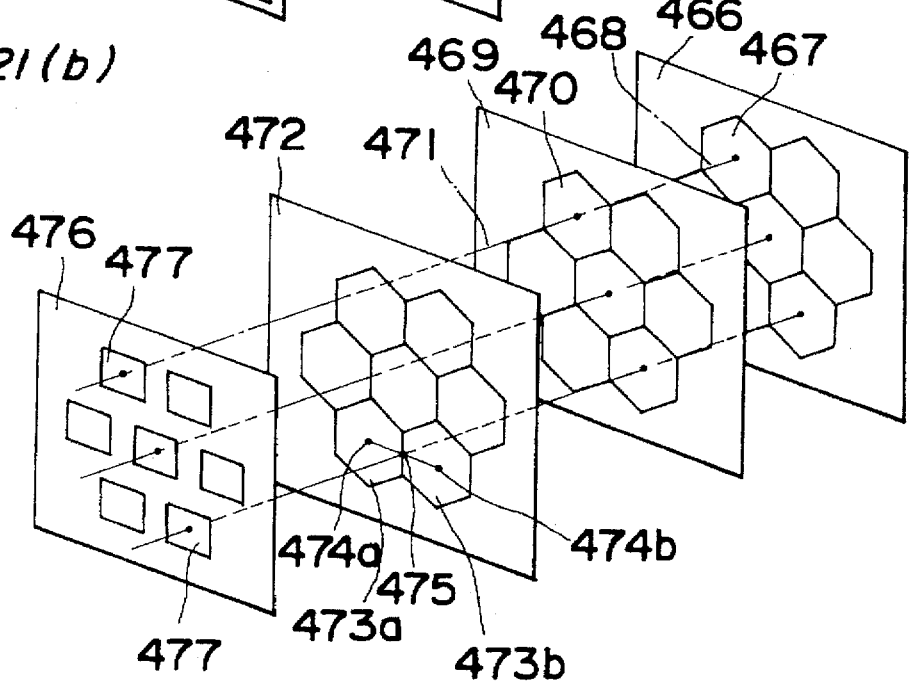

By way of example, an arrangement as shown in FIG. 21(a) may be adopted such that an optical axis 453 of the microlens element 452 for a first lens array 451 is aligned with an optical axis 456 of the microlens element 455 for the third lens array 454 and passes through a center point 460 of a straight line which connects the centers 459a and 459b of the neighboring two lens elements 458a and 458b of the second lens array 457. However, in this case, the optical axis 453 is required to pass through the pixel 462 of the liquid crystal panel 461. Also, in the case where the pixels of the liquid crystal panel are of the delta disposition, the arrangement may be made as shown in FIG. 21(b) such that an optical axis 468 of the microlens element 467 for a first lens array 466 is aligned with an optical axis 471 of the microlens element 470 of the third lens array 469 and passes through a center point 475 of a straight line which connects the centers 474a and 474b of neighboring two microlens elements 473a and 473b of the second lens array 472, and also passes through the pixels 477 of the liquid crystal panel 476.

Figure 22A:
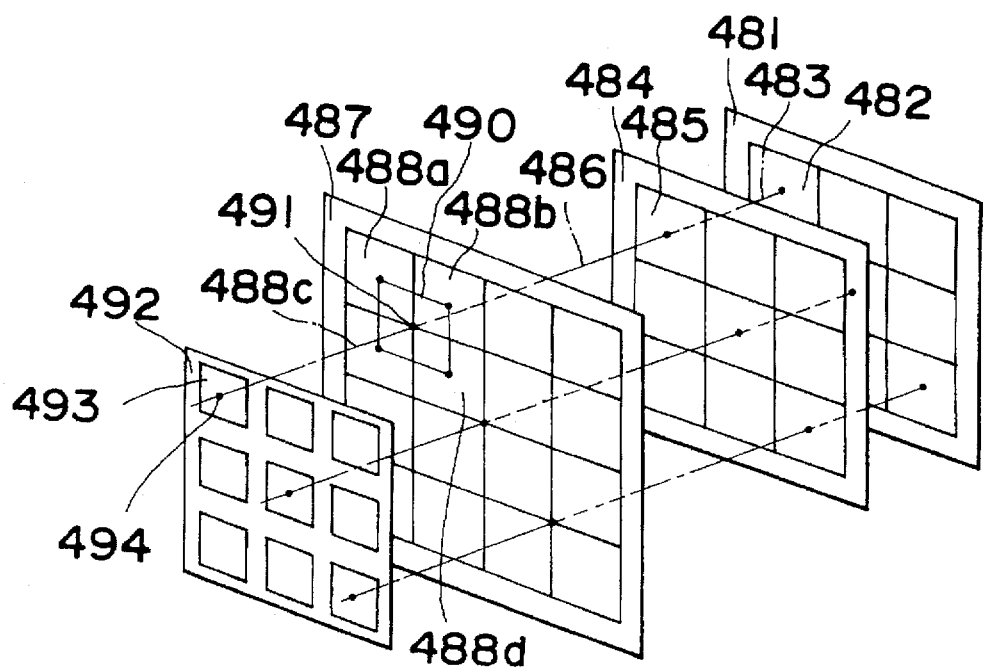
FIGS. 22(a) and 22(b) are schematic perspective diagrams showing the construction of light valve apparatuses according to still further embodiments of the present invention.

In the case where the pixels of the liquid crystal panel are of the square disposition, an arrangement as shown in FIG. 22(a) may be adopted such that an optical axis 483 of the microlens element 482 for a first lens array 481 is aligned with an optical axis 486 of the lens element 485 for the third lens array 484, and passes through the center 491 of a rectangle formed by lines which connect the centers of the neighboring four microlens elements 488a, 488b, 488c and 488d of the second lens array 487, and also passes through the center 494 of the pixel 493 of the liquid crystal panel 492.

Figure 22B:
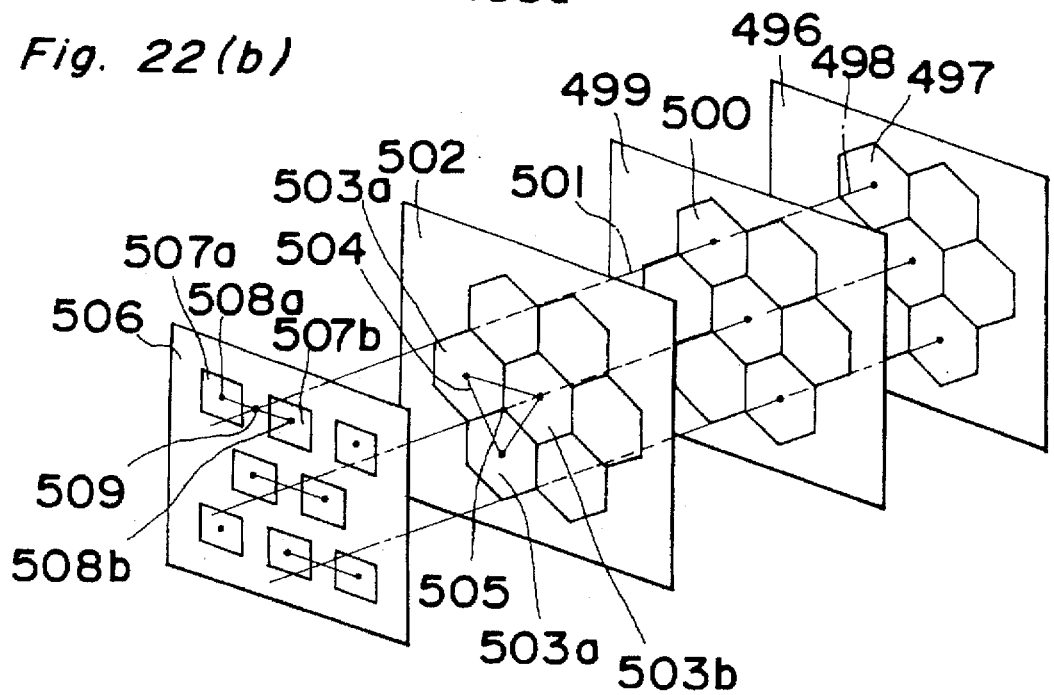
Figure 23:
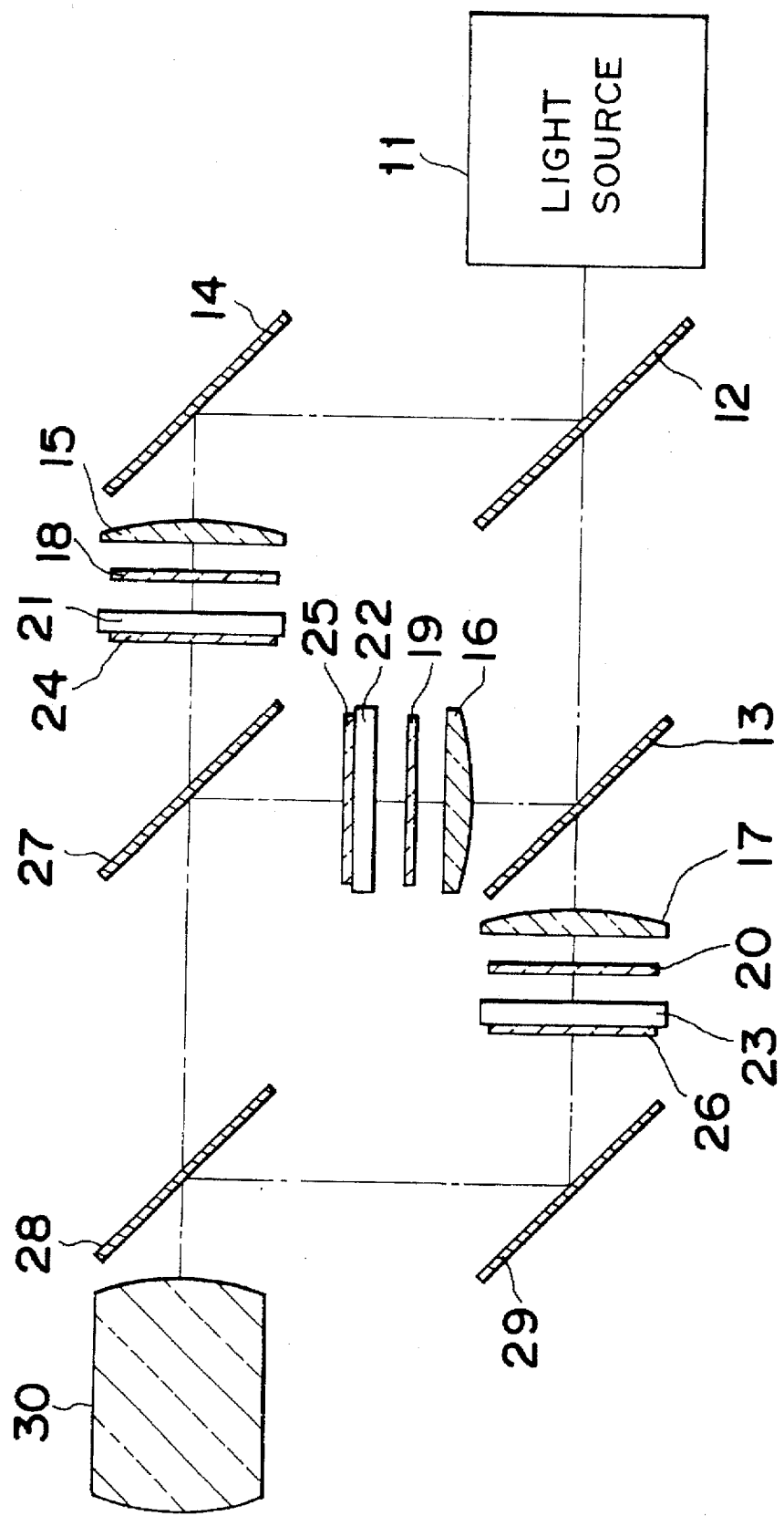
FIG. 23 is a schematic side sectional diagram showing construction of a conventional projection display system.
Figure 24:
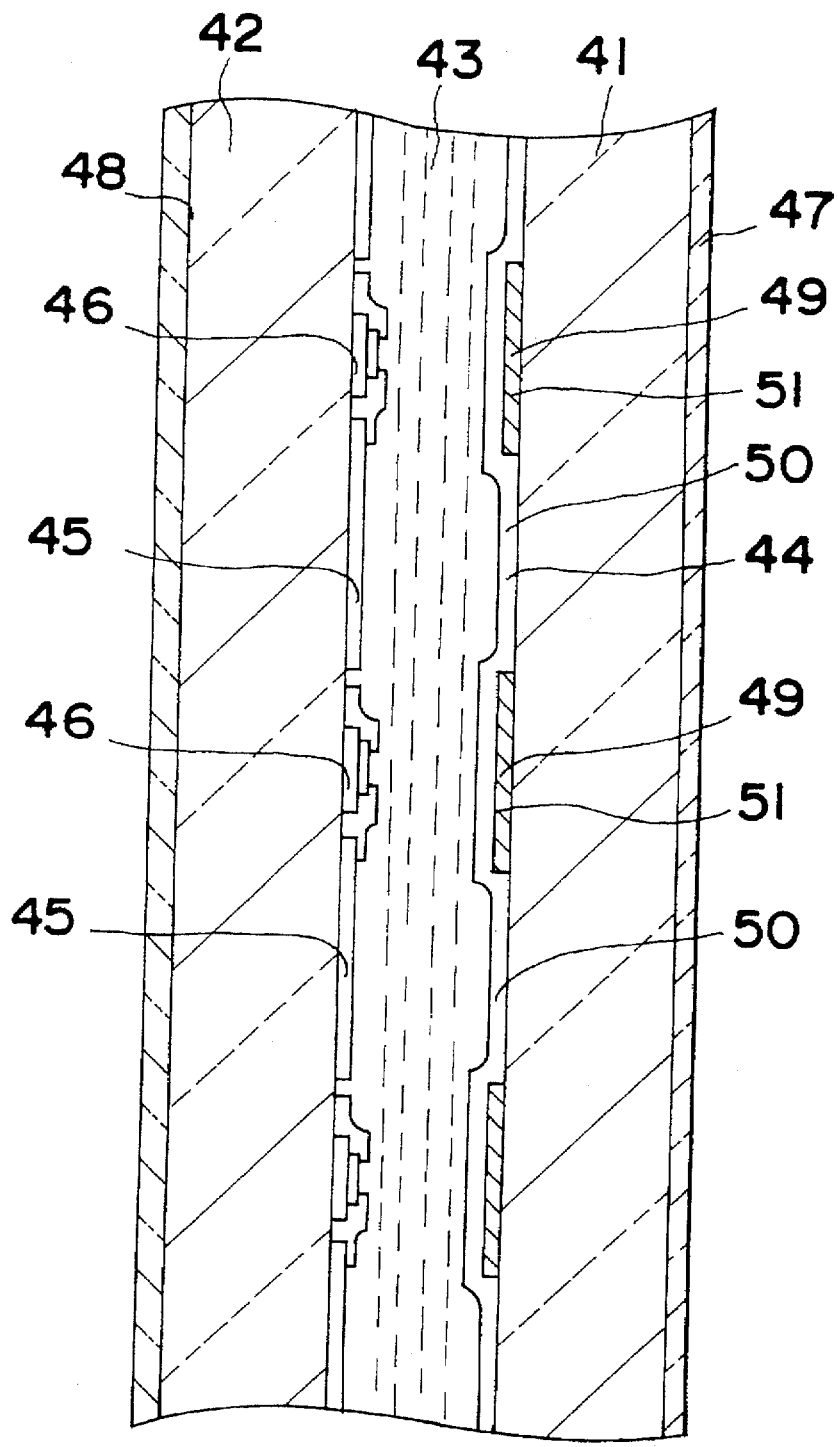
FIG. 24 is a schematic fragmentary side sectional diagram showing, on an enlarged scale, the construction of a conventional liquid crystal panel.

Furthermore, in the case of the delta disposition, an arrangement as shown in FIG. 22(b) may be adopted in which an optical axis 498 of the microlens element 497 for a first lens array 496 is aligned with an optical axis 501 of each of the lens element 500 of a third lens array 499, and further passes through an outer center 505 of a triangle 504 constituted by lines which connect the centers of neighboring three microlens elements 503a, 503b, and 503c for the second lens array 502, and also, passes through a center point 509 of a line connecting the centers 508a and 508b of the pixels 507a and 507b for the liquid crystal panel 506. In any of the above case, the real image of the very small light source formed on the focal point of each of the microlens elements for the first lens array can be formed on each of the pixels of the liquid crystal panel by the second lens array.

In the case of the arrangements as shown in FIGS. 19(a) through 22(b), the conditions without any wasteful function of the projection lens are represented by an equation as follows which is different from the condition represented by the equation (5) referred to earlier.

$$f_2 = mf_1 \qquad (6)$$

where $f_1$ is a focal length of the first lens array, and $f_2$ is a focal length of the second lens array.

The lens arrays which play an important part in the light valve apparatus according to the present invention require supporting means. In addition to the embodiments as described so far, an arrangement can be adopted such that a glass substrate is disposed close to the incident side of the liquid crystal panel, and a first lens array is formed on the face of the incident side of the glass substrate, with a second lens array being formed on the face of an incident side of an incident side glass substrate of the liquid crystal panel. Furthermore, in the case where a third lens array is to be employed, it may be, for example, arranged that such a third glass substrate is disposed at an incident side glass substrate of a liquid crystal panel, and a second glass substrate is disposed at an incident side of a third glass substrate, while a first glass substrate is disposed at an incident side of a second glass substrate, and a first lens array is formed at the face of an emitting side of the first glass substrate, and a third lens array is formed on an emitting side face of the second glass substrate, with a second lens array being formed on the face of the emitting side of the third glass substrate. Moreover, it is also possible to employ an arrangement in which a second lens array is formed at the face of an incident side of an incident side glass substrate of the liquid crystal panel, and a second glass substrate is disposed at an incident side of a second lens array, while a first glass substrate is disposed at an incident side of a second glass substrate, while a third lens array is formed at an incident side of a second glass substrate, and a first lens array is formed at any of the incident sides or faces of the emitting side of the first glass substrate. Similarly, another arrangement may be employed such that a second glass substrate is disposed at an incident side of an incident side glass substrate of a liquid crystal panel, and a first glass substrate is disposed at an incident side of a second glass substrate, while a first lens array is formed on the face of an incident side of the first glass substrate, with a third lens array formed on the face of an emitting side thereof, and a second lens array is formed on an emitting side face of the second glass substrate.

Moreover, it may be so arranged that a second lens array is formed on the face of an incident side of an incident side glass substrate of the liquid crystal panel, and a glass substrate is disposed at an incident side of the second lens array, while a first lens array is formed on the face of the incident side of the glass substrate, and the third lens array is formed on the face of the emitting side thereof.

The pitch of the microlens elements for the first lens array may be made slightly larger than that of the pixels for the liquid crystal panel. When the pitches and disposition of the second lens array and the third lens array are properly selected by a simple drawing of an optical path diagram, it can be seen that the real images of the very small light sources formed on the focal points of the respective lens elements for the first lens array can be formed on the pixels of the liquid crystal panel by the second lens array through a reduction of loss by the microlens elements for the third lens array. By such an arrangement, since the principal light rays passing through the pixels at the peripheral portions of the liquid crystal panel can be directed inwards, an auxiliary lens 139 employed in the arrangement as shown in FIG. 10 may be dispensed with.

In the liquid crystal panel employing the TN liquid crystals, favorable contrast may be obtained in a direction slightly inclined from a normal line of the liquid crystal layer, and therefore, in order to obtain a projection image having a high contrast, arrangement can be made so as to direct light upon the liquid crystal panel slantwise. In this case, the arrangement may be made so as to subject the microlens element group for the first lens array, that for the second lens array, and that for the third lens array, to a slightly parallel displacement with respect to the liquid crystal panel, such that the real images of the very small light sources to be formed on the respective focal points of the first lens array are formed on the respective pixels of the liquid crystal panel.

In both of the light valve apparatus and the light valve, in addition to the manufacturing method of the lens array plates as described earlier with reference to the first embodiment, there has been conventionally proposed a method in which a refractive index distribution lens is formed on the surface of a glass substrate by ion exchange, selective diffusion or the like as disclosed, for example, in Japanese Patent Laid-Open Publication Tokkaihei No. 2-302726 or a method in which transparent thermoplastic resin is overlapped on a glass substrate for forming lenses by heat molding.

It is to be noted here that in the foregoing embodiments, although the TFT liquid crystal panel using TN liquid crystals has been described for the light valve, liquid crystal panels of other systems or panels using electro-optical crystal, for example, may also be used as long as they can form optical images as variation of optical characteristics.

Although the present invention has been fully described by way of examples with reference to the accompanying drawings, it is to be noted here that various changes and modifications will be apparent to those skilled in the art. Therefore, unless such changes and modifications depart from the scope of the present invention, they should be construed as being included within the present invention.

What is claimed is:

1. A light valve apparatus comprising:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array being adapted to form real images of a virtual light source at focal points of said first lens array on the corresponding pixels of said light valve, wherein said first lens array is formed on the face of an emitting side or in the vicinity of a surface of a transparent substrate disposed at an incident side of said light valve, and said second lens array is formed on an incident face or in the vicinity of a surface of another transparent substrate disposed at an incident side of said light valve.

2. A light valve apparatus which comprises:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein an optical axis of each of the microlens elements of said second lens array is aligned with an optical axis of the corresponding microlens elements of said first lens array; and wherein $f_2 = (2m+1)f_1/2$, where $f_1$ is a focal length of each of the microlens elements for said first lens array, $f_2$ is a focal length of each of the microlens elements for said second lens array, and m is a positive integer.

3. A light valve apparatus comprising:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein the pixels of said light valve are arranged in a square matrix pattern, and wherein an optical axis of each of said microlens elements of said first lens array passes through a middle point of a line segment connecting centers of two adjacent microlens elements of said second lens array.

4. A light valve apparatus as claimed in claim 3, wherein $f_2=mf_1$, wherein $f_1$ is a focal length of each of the microlens elements for said first lens array, $f_2$ is a focal length of each of the microlens elements for said second lens array, and m is a positive integer.

5. A projection display system comprising:

a light source;

a light valve apparatus upon which light emitted from said light source is incident and in which optical images are formed according to video signals; and a projection lens for projecting said optical images onto a projection screen;

said light valve apparatus including:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein the pixels of said light valve are arranged in a square matrix pattern, and wherein an optical axis or each of said microlens elements of said first lens array passes through a middle point of a line segment connecting centers of two adjacent microlens elements of said second lens array.

6. A view-finder system comprising:

a light source;

a light valve apparatus upon which light emitted from said light source is incident and in which optical images are formed according to video signals;

a magnifying lens for magnifying said optical images;

said light valve apparatus including:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array being adapted to form real images of a virtual light source at focal points of said first lens array on the corresponding pixels of said light valve, wherein the pixels of said light valve are arranged in a square matrix pattern, and wherein an optical axis of each of said microlens elements of said first lens array passes through a middle point of a line segment connecting centers of two adjacent microlens elements of said second lens array.

7. A light valve apparatus comprising:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein the pixels of said light valve are arranged in a square matrix pattern, and wherein an optical axis of each of said microlens elements of said first lens array passes through a center of a square formed by connecting centers of four adjacent microlens elements of said second lens array.

8. A light valve apparatus as claimed in claim 7, wherein $f_2=mf_1$, wherein $f_1$ is a focal length of each of the microlens elements for said first lens array, $f_2$ is a focal length of each of the microlens elements for said second lens array, and m is a positive integer.

9. A projection display system comprising:

a light source;

a light valve apparatus upon which light emitted from said light source is incident and in which optical images are formed according to video signals; and a projection lens for projecting said optical images onto a projection screen;

said light valve apparatus including:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein the pixels of said light valve are arranged in a square matrix pattern, and wherein an optical axis of each of said microlens elements of said first lens array passes through a center of a square formed by connecting centers of four adjacent microlens elements of said second lens array.

10. A view-finder system comprising:

a light source;

a light valve apparatus upon which light emitted from said light source is incident and in which optical images are formed according to video signals;

a magnifying lens for magnifying said optical images;

said light valve apparatus including:

a light valve in which a plurality of pixels are arranged in a first matrix pattern;

a first lens array in which a plurality of microlens elements are arranged in a second matrix pattern similar to the first matrix pattern of the pixels of said light valve, and which is located at an incident side of said light valve; and a second lens array in which a plurality of microlens elements are arranged in a third matrix pattern similar to the first matrix pattern of the pixels of said light valve, and which is located between said light valve and said first lens array;

wherein a focal length of each of the microlens elements of said first lens array is equal to or shorter than a focal length of each of the microlens elements of said second lens array, the respective microlens elements of said second lens array means being adapted to form real images of a virtual light source at focal points of said first lens array on the corresponding pixels of said light valve, wherein the pixels of said light valve are arranged in a square matrix pattern, and wherein an optical axis of each of said microlens elements of said first lens array passes through a center of a square formed by connecting centers of four adjacent microlens elements of said second lens array.

* * * * *